US006393534B1

(12) United States Patent
Chen et al.

(10) Patent No.: US 6,393,534 B1
(45) Date of Patent: May 21, 2002

(54) SCHEDULER FOR AVOIDING BANK CONFLICTS IN ISSUING CONCURRENT REQUESTS TO MAIN MEMORY

(75) Inventors: Andrea Y. J. Chen, Sunnyvale; Lordson L. Yue, Foster City, both of CA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/407,131

(22) Filed: Sep. 27, 1999

(51) Int. Cl.$^7$ .............................................. G06F 12/00
(52) U.S. Cl. .......................................... 711/158; 711/5
(58) Field of Search .............................. 711/5, 158, 167

(56) References Cited

U.S. PATENT DOCUMENTS

| | | | | |
|---|---|---|---|---|
| 5,323,489 A | * | 6/1994 | Bird ............................ | 711/167 |
| 5,432,918 A | * | 7/1995 | Stamm ........................ | 711/156 |
| 5,440,713 A | * | 8/1995 | Lin et al. ..................... | 711/158 |
| 5,522,059 A | * | 5/1996 | Marushima et al. ......... | 711/149 |
| 5,692,209 A | * | 11/1997 | Meaney et al. .............. | 710/244 |
| 5,740,402 A | * | 4/1998 | Bratt et al. ................... | 711/157 |
| 5,752,259 A | * | 5/1998 | Tran ............................ | 711/125 |
| 5,781,918 A | * | 7/1998 | Lieberman et al. ............ | 711/5 |
| 5,796,758 A | * | 8/1998 | Levitan ....................... | 714/800 |
| 6,029,225 A | * | 2/2000 | McGehearty et al. .......... | 711/5 |
| 6,035,376 A | * | 3/2000 | James ......................... | 711/145 |
| 6,192,487 B1 | * | 2/2001 | Douceur ........................ | 714/8 |

OTHER PUBLICATIONS

"Direct RDRAM™ 64/72–Mbit (256Kx16/18x16d)", Rambus Advance Information, 64M/72M Direct RDRAM Data Sheet, last modified on Mar. 12, 1998; 48 pps.
Crisp, "Direct Rambus Technology: The New Main Memory Standard", IEEE Micro, Nov./Dec. 1997, pps. 18–28.
"Direct RAC (Rambus® ASIC Cell)", Rambus Advance Information, Direct RAC Product Summary, ©May 1998, pps. 1–2.
"Direct Rambus™ Memory for Desktop PC Systems", Rambus, Inc., ©May 1998, pps. 1–4.
Crisp, "Applications for Rambus® Interface Technology", Rambus, Inc., ©Feb. 1998, pps. 1–6.

* cited by examiner

Primary Examiner—Matthew M. Kim
Assistant Examiner—Christian P. Chace
(74) Attorney, Agent, or Firm—Vedder, Price, Kaufman & Kammholz

(57) ABSTRACT

A main memory scheduler includes a store, and stores therein requests for accessing main memory (such as a read request, a write request, or a refresh request). Normally, the main memory scheduler issues requests from the store to the main memory in an order different from the order in which the requests are received, for example, to avoid bank conflicts. In this example, the main memory scheduler issues a first request to a first memory bank that is not coincident with (and in case of dependent banks, not adjacent to) a second memory bank (that is being currently accessed) prior to issuing a second request to a memory bank that is coincident with the (or adjacent to) second memory bank. Moreover, the main memory scheduler issues a refresh request prior to issuing a read request or a write request even if the refresh request was most recently received, thereby to prioritize the refresh request ahead of read and write requests. Similarly, the main memory scheduler prioritizes a majority of read requests ahead of write requests, so that a processor that originates a read request is not normally stalled by a previously issued write request, as would be the case in first-in-first-out (FIFO) issuance of memory requests. The main memory scheduler performs FIFO processing, for example, when a later-received read request and an earlier-received write request both access the same location in main memory, or when the number of pending write requests exceeds a predetermined limit. Such prioritization of requests can be made programmable, depending on signals held in storage elements that are included in the main memory scheduler.

13 Claims, 26 Drawing Sheets

-PRIOR ART-

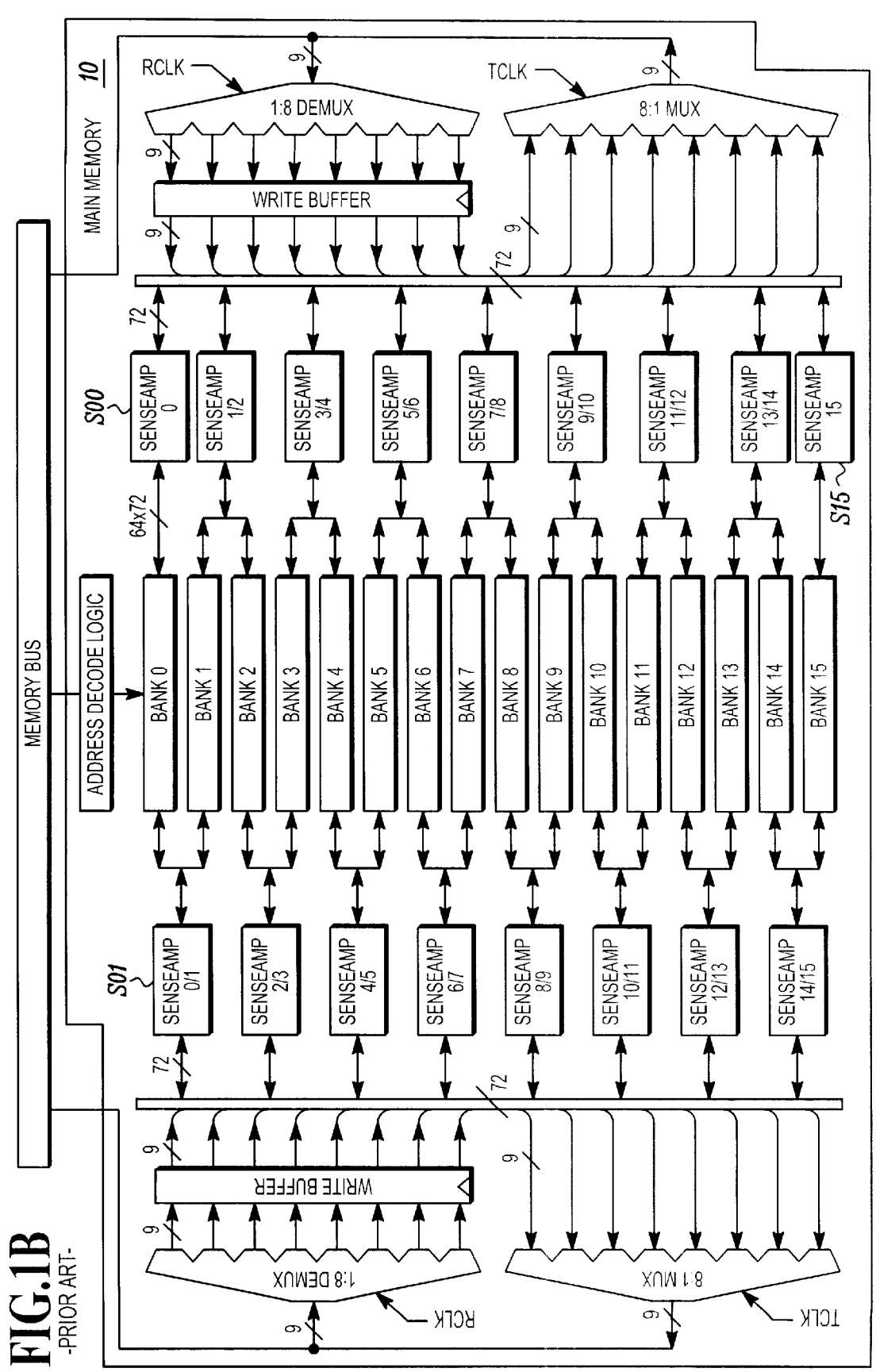
FIG.1B -PRIOR ART-

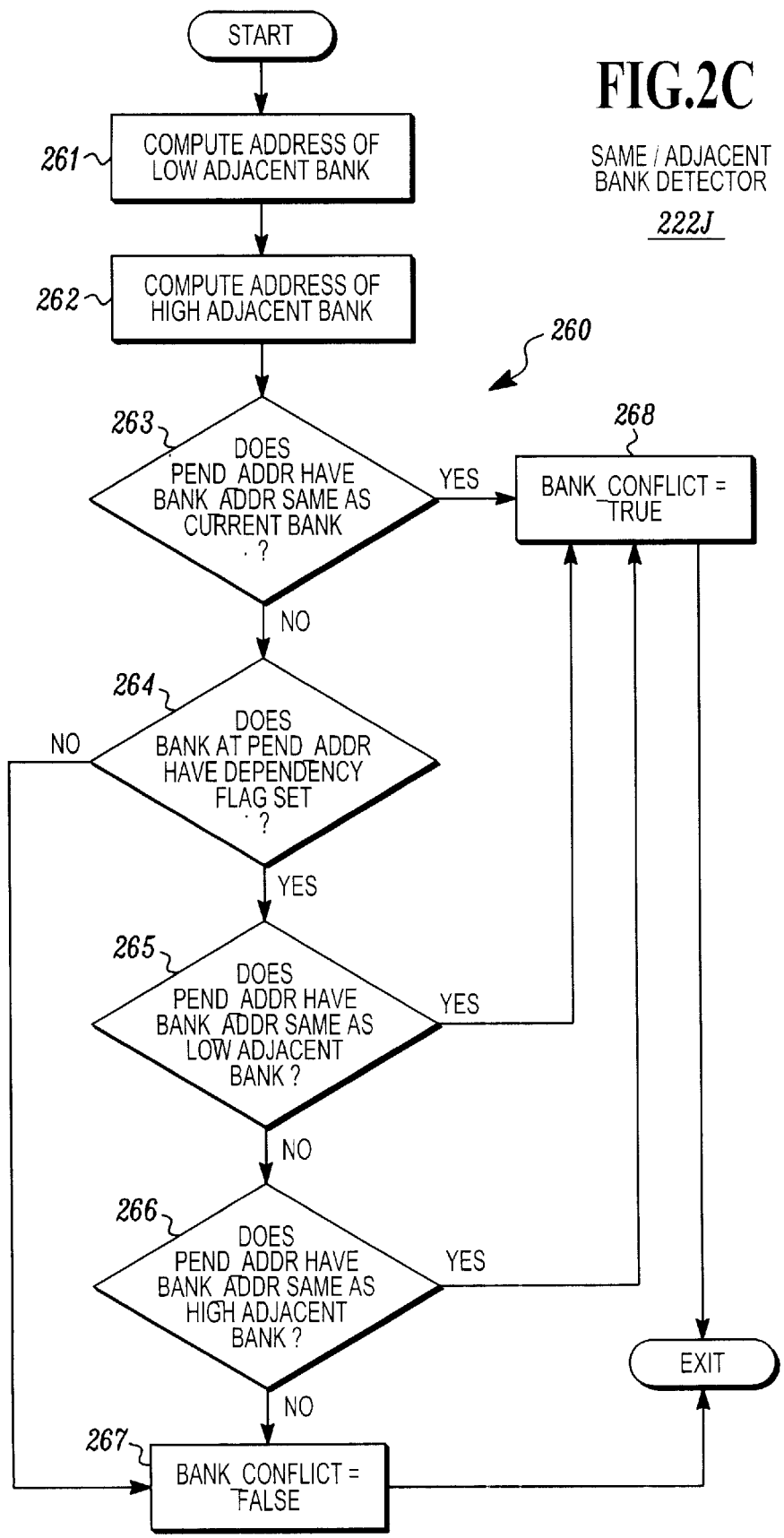

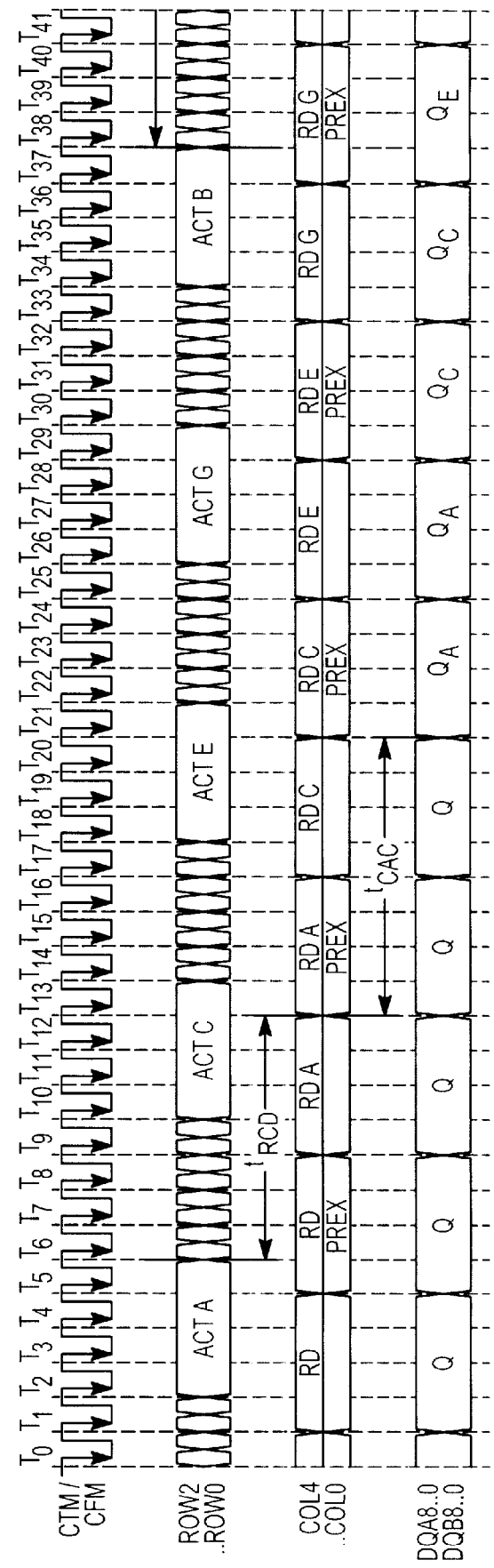
FIG.2E
FIG.2D1
FIG.2D

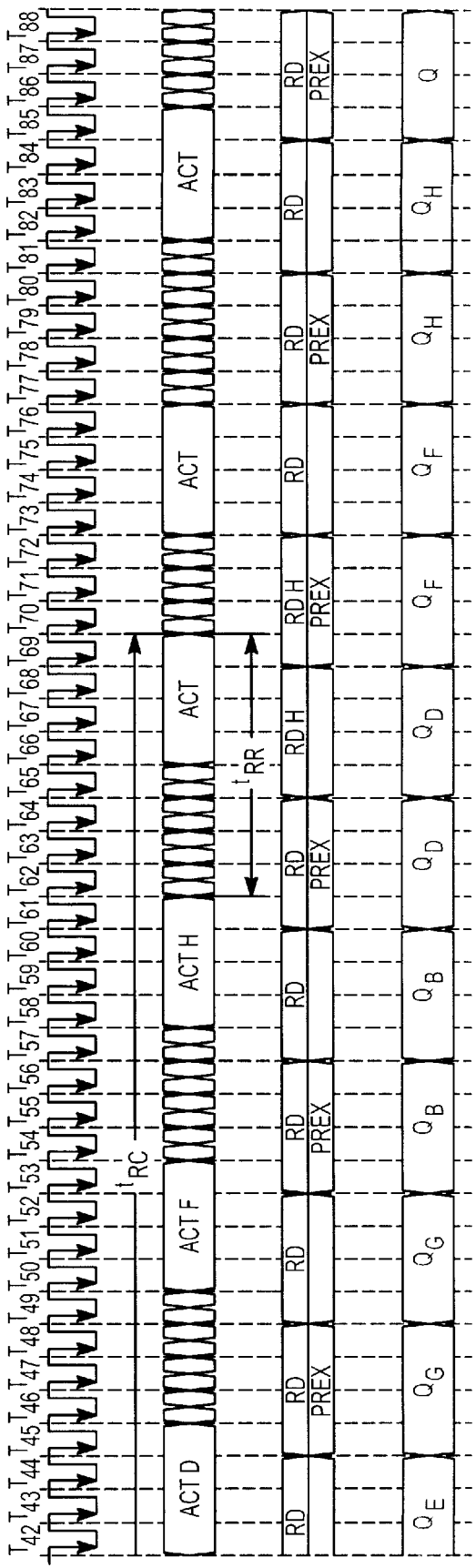
FIG.2D2

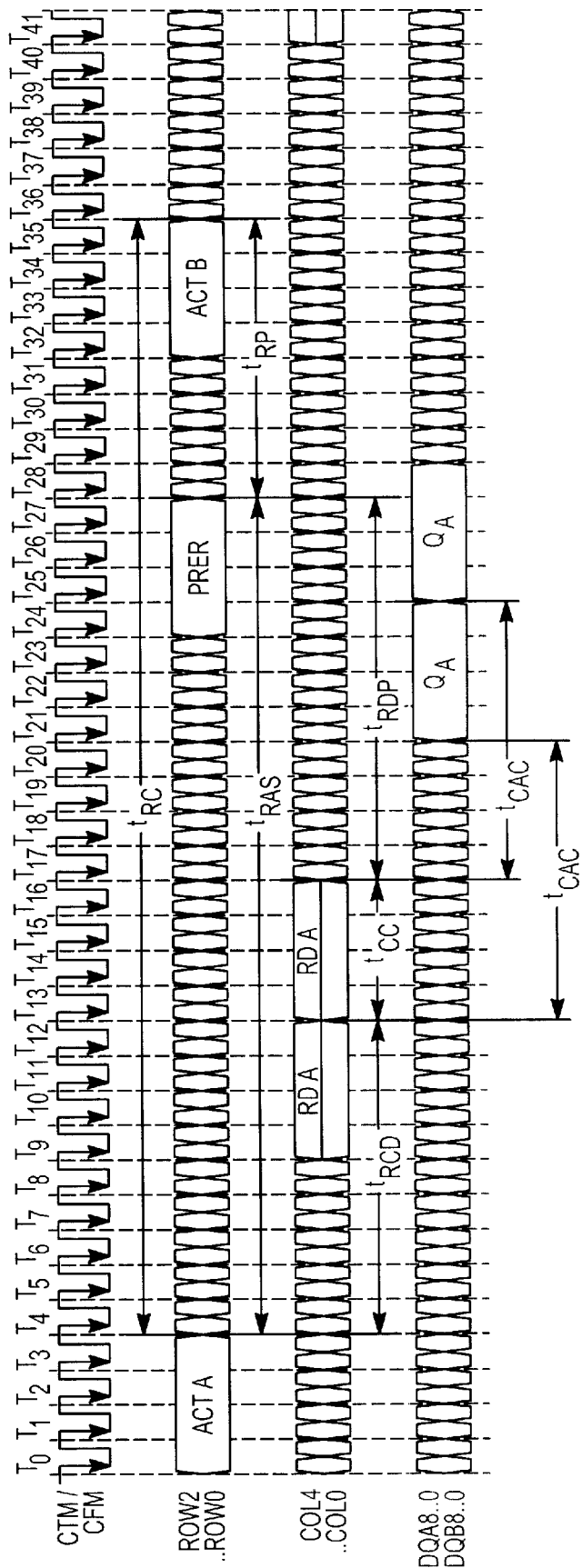
FIG.2E1

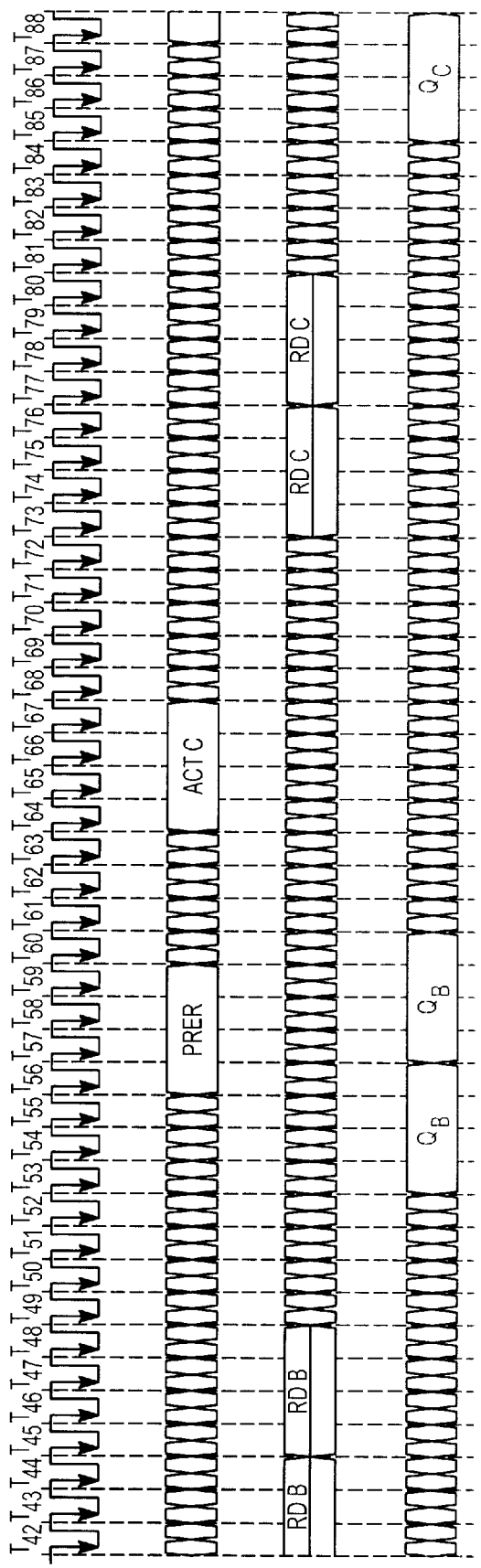
FIG.2E2

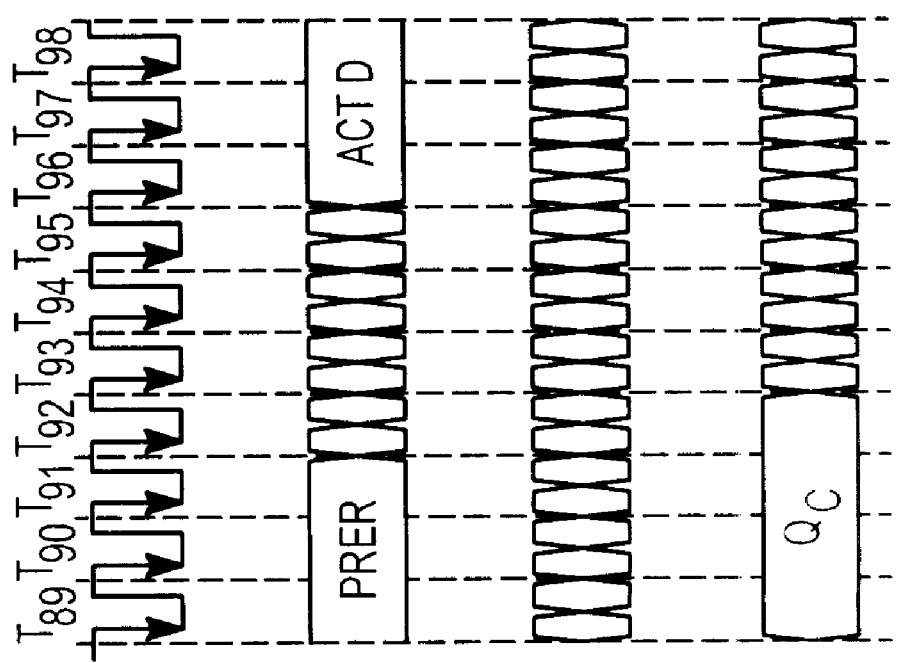
FIG.2E3

SCHEDULER FOR AVOIDING BANK CONFLICTS IN ISSUING CONCURRENT REQUESTS TO MAIN MEMORY

CROSS REFERENCE TO RELATED APPLICATION

This application is related to and incorporates by reference herein in its entirely, the commonly owned, concurrently filed, copending U.S. patent application Ser. No. 09/404,224, entitled "A Circuit And Method For Detecting Bank Conflicts In Accessing Adjacent Banks", also by Andrea Y. J. Chen and Lordson L. Yue.

BACKGROUND OF THE INVENTION

Main memory 10 (FIG. 1A) for a conventional computer is normally implemented by one or more dynamic random access memories (abbreviated as "DRAMs") that are coupled by a memory bus 11 to an interface circuit 12 (implemented by a "north bridge chip") that in turn is coupled to a central processing unit (CPU) 13. Interface circuit 12 is typically coupled to a system bus 14 (such as a PCI bus) that may be coupled to other devices (not shown).

Certain CPUs that require main memory to support a bandwidth of at least 500 Mbytes/s can use a specific type of DRAM called "Direct RDRAM." A main memory 10, when implemented with a Direct RDRAM, requires interface circuit 12 to include a specific circuit called "Rambus Access Cell" (abbreviated as RAC) 15 (FIG. 1A) that supplies commands as well as row and column addresses to the Direct RDRAM. One example of a conventional Direct RDRAM includes sixteen memory banks 0–15 and seventeen sense amplifiers (abbreviated as "sense amps") S00–S15 (FIG. 1B). Sense amplifiers S00–S15 temporarily hold the data to be transferred to/from banks 0–15. For example, a sense amp S01 that is shared between adjacent banks 0 and 1 holds data to/from either of banks 0 and 1. Due to such sharing of sense amps, two adjacent banks (e.g. bank 0 and bank 1) cannot be accessed simultaneously in the Direct RDRAM.

This limitation on the simultaneous access of adjacent banks is described in a data sheet entitled "Direct RDRAM™ 64/72-Mbit (256K×16/18×16d)," available from RAMBUS Inc., 2465 Latham Street, Mountain View, Calif., USA 94040 that is incorporated by reference herein in its entirety. In an example wherein the two transactions have the same device and bank addresses, but different row addresses, the data sheet states that "[t]ransaction b may not be started until transaction a has finished. However, transactions to other banks or other devices may be issued during transaction a." The data sheet further states that the second transaction "must occur a time $t_{rc}$ or more after" the first transaction. See the last paragraph in the second column of each of pages 20 and 21.

Conventional use of Direct RDRAMs in computers is described in an article entitled "DIRECT RAMBUS TECHNOLOGY: The New Main Memory Standard," by Richard Crisp, IEEE Micro, November/December, 1997, pages 18–28 that is also incorporated by reference herein in its entirety. According to the just-described article, such "[d]irect RDRAMs avoid the empty time slots, or 'bubbles,' that frequently occur in single clocked SDRAM systems. Bubbles result from inadequate control bandwidth necessary to support page manipulation and scheduling while transferring data to and from random locations. Doubled data rate schemes only aggravate the bubble problem." Id at page 22.

The article further states that "[u]sers can schedule the data resulting from the row operation to appear immediately after the column operation completes. This highly interleaved condition greatly improves the efficiency of the channel. This interleaving can only happen when the requests target different banks in either the same Direct RDRAM or a different RDRAM on the channel. The more banks in a system, the better the chances are that any two requests are mapped to different banks. The more interleaving that is possible, the more the memory system performance improves. The Direct RDRAM's memory array is divided into banks. . . . all 64-Mbit Direct RDRAMs in development have 16 banks with a page size of 1 Kbyte." Id at page 23.

The article also states that "[b]ecause a Direct RDRAM spans the entire channel, the CPU accesses each RDRAM independently. So each RDRAM directly adds to the number of memory banks accessible to the memory controller. . . . Since an RDRAM system has more banks per megabyte than an SDRAM or a DDR system, RDRAM systems boast lower bank conflict rates . . . " Id.

SUMMARY

A scheduler (hereinafter "main memory scheduler") in accordance with the invention issues requests to main memory in an order different from the order in which the requests are received, in order to minimize bank conflicts. Specifically, the main memory scheduler has a scheduler input port for receiving in a first order (also called "received order") requests (also called "memory requests") for accessing the main memory (such as a read request, a write request, or a refresh request), and a scheduler output port that is couplable (i.e. capable of being coupled) to the main memory. A main memory scheduler of one embodiment temporarily stores each received memory request (also called "pending memory request") in a store (called "memory request store"), and issues the pending memory requests at the scheduler output port in an order (also called "second order") that is different from the received order.

The main memory scheduler includes, in addition to the just-described memory request store, a multiplexer and a memory request selector that uses the multiplexer to select, for issue to main memory, a pending memory request that avoids a bank conflict. The pending memory requests in the memory request store are checked by the scheduler for bank conflicts with one or more requests that were previously issued and are currently being executed (also called "currently issued requests"). Specifically, the main memory scheduler implements a scheme (also called "bank conflict optimization" scheme) by issuing a second request to a second memory bank that is not coincident with (and preferably not adjacent to) a first memory bank (that is being currently accessed). Therefore, a main memory scheduler as described herein can be used to interleave later-received requests among previously-received requests to the same bank or to adjacent banks, wherein adjacent banks share sense amplifiers (such as banks in Direct RDRAMs of the type described above).

Interleaving of accesses to adjacent banks (as described herein) reduces the time period from the time the request is received to the time the request is fulfilled (also called "access latency"). Also, such interleaving of accesses reduces the number of unused cycles (also called "bubble cycles") otherwise required to be inserted when accessing adjacent banks successively, thereby improving utilization of the memory bandwidth. Furthermore, interleaving of accesses as described herein allows the interleaved accesses to be issued in accordance with one or more schemes (such as the "read bypass of writes") as described herein, thereby further reducing or eliminating the need for bubble cycles.

The memory request selector includes a bank conflict detector that compares at least a portion (e.g. n bank address bits, when there are a total of $2^n$ banks in the main memory) of a current address signal (i.e. an address signal generated by a currently issued request) with a corresponding portion of one or more (in one implementation all) to-be-issued memory address signals held in the memory request store, to select one or more next address signals that are ready to be issued to main memory. The bank conflict detector selects (via the multiplexer) a next address signal that identifies a memory bank that is not adjacent to and that is not coincident with the memory bank being identified by any current address signal, thereby to minimize bank conflicts. If a bank conflict cannot be avoided by issuing the pending requests in an order different from the received order, the main memory scheduler issues the pending requests in the order of receipt, and inserts bubble cycles in the normal manner.

In one embodiment, in addition to (or instead of, in another embodiment) the just-described bank conflict detector, the memory request selector includes an optimizer that issues read requests prior to issuance of write requests (thereby to give higher priority to read requests in a scheme called "read bypass of write"), unless a read request and a write request (also called "earlier-received" write request) that was received prior to the read request access the same location in main memory. When the just-described two requests access the same location, they are processed in the order of receipt to ensure consistency in the data being written and read. In one particular implementation, the memory request store includes, for each pending memory request, a wait storage element. The scheduler of this embodiment also includes a read interlock logic that stores an active signal in the wait storage element for a later-received read request when an earlier-received write request accesses the same location, thereby to indicate that the read request is to be performed after the write request. On completion of the earlier-received write request, the read interlock logic stores an inactive signal in the wait storage element for the later-received read request, thereby to indicate that the read request is ready to be issued. Use of wait storage elements and read interlock logic as described herein ensures data consistency when using a concurrent access scheme for issuing multiple requests to main memory (so that one or more of the requests are executed simultaneously).

Moreover, in the above-described scheme, a device from which a read request is received (such as a CPU) is not normally stalled by an earlier-received write request, as would be the case in a non-prioritized, first-in-first-out (FIFO) processing of read and write requests. When only write requests are pending, a main memory scheduler of the type described herein performs bank conflict optimization among the pending write requests. Note that stalling can occur even when using the above-described scheduler, e.g. when two requests access the same location as described above.

In four examples, the main memory scheduler performs FIFO processing when (1) there are two pending requests to access the same locations: a write request and a read request, (2) the pending requests are related to configuration, e.g. accessing certain registers in the memory request selector (e.g. to change prioritization in the processing of pending requests), (3) the number of write requests that are pending is greater than a predetermined number, and (4) when a write request has been pending for a predetermined time period. In the third and fourth examples, FIFO processing frees up storage units in the scheduler that hold read requests that have been processed in accordance with "read bypass of writes" scheme, and that are located between storage units that hold write requests. Such freed storage units can be used for holding additional requests. FIFO processing can be performed in other situations as well, depending on the specific requirements of a given implementation as discussed herein.

Depending on the embodiment, the optimizer can implement one or more additional schemes for selecting a pending memory request for issue. In one request selection scheme (also called "display-controller" scheme), the memory request selector prioritizes read requests that originate from a predetermined device, such as display controller, ahead of requests from other devices thereby to ensure that the display controller is not stalled by earlier issued read requests (e.g. from the CPU). In another request selection scheme (also called "hardware request" scheme), the memory request selector selects, for issue to the main memory, a request that relates to hardware management (such as a refresh request for DRAM or a current control request) prior to selection of a read request or a write request even if such a hardware request was most recently received, thereby to prioritize the hardware request ahead of the read and write requests.

BRIEF DESCRIPTION OF THE DRAWINGS

FIGS. 1A and 1B illustrate, in a high level block diagram and a detailed block diagram, a prior art computer and main memory respectively.

FIG. 2C illustrates, in a flow chart, the detection of bank conflict by one embodiment of a circuit (also called "same/adjacent bank detector") 251J included in bank conflict detector 222 of FIG. 2B.

FIGS. 2D and 2E (formed of FIGS. 2D1, 2D2 and 2E1, 2E2 respectively) illustrate, in timing diagrams, concurrent memory accesses to Direct RDRAM performed in the presence of the adjacent bank detector of FIG. 2B.

FIGS. 3D, 3F, 3H and 3I illustrate, in low level flowcharts, acts performed by four different implementations of the same/adjacent bank detector illustrated in FIG. 3A.

DETAILED DESCRIPTION

Figure 1A:
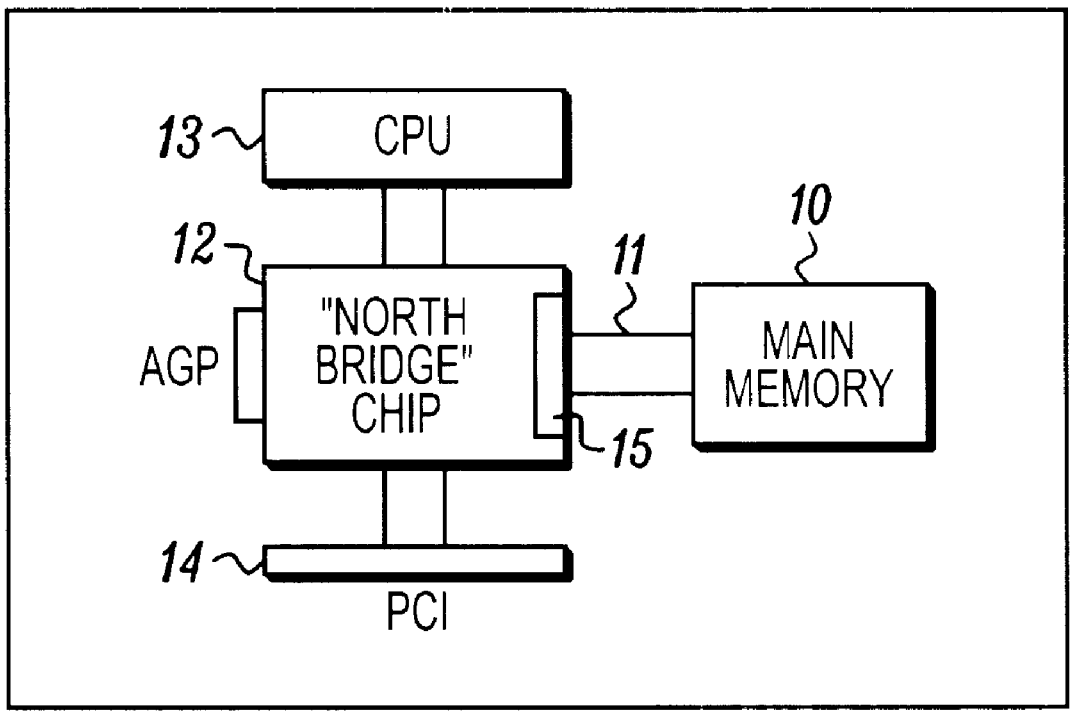

In one embodiment, a main memory scheduler 200 (FIG. 2A) has a scheduler input port 201 (formed of address input terminals 201A and data input terminals 201D) for receipt of requests (also called "memory requests") for accessing a main memory 203. A memory request can be an access request that requires access to a specified location in main memory, such as a read request (received only on terminals 201) or a write request (received on terminals 201A and 201D). Alternatively, a memory request can be an internally-generated control request (also called "hardware request"), such as a refresh request for the DRAM or a current control request for the RAC (see the above description of RAC and DRAM in reference to FIGS. 1A and 1B). Depending on the implementation, hardware requests may be handled outside of scheduler 200. Moreover, scheduler 200 can also be implemented to handle other types of requests, e.g. (1) requests to access registers related to main memory scheduler 200, and (2) requests related to changing power state command of the DRAM (e.g., see power-mode control for Direct RDRAM as described in the section entitled, "Power State Management in the 64M/72M Direct RDRAM Data Sheet" identified above).

Scheduler 200 receives a number of access requests at input port 201 in a first order, also called "received order," and stores at least a portion (e.g. address) of the access requests in the first order in store 210. Scheduler 200 also has a scheduler output port 202 (formed by address output terminals 202A and data output terminal 202D) that is couplable (e.g. via a memory interface unit 204 that may include a RAC of the type described above in reference to FIG. 1B) to main memory 203.

Main memory 203 includes a number of banks 203A–203M (wherein A≦I≦K≦M, M being the total number of banks), and each bank 203I may share a sense amplifier with a low adjacent bank 203I-1, or with a high adjacent bank 203I+1, or with both adjacent banks 203I-1 and 203I+1 (in a manner similar or identical to Direct RDRAMs of the type also described above in reference to FIG. 1B). Depending on the implementation, one or more of banks 203A–203M may be accessed independent of their adjacent banks. That is, all banks 203A–203M can be either "bank dependent" type or "independent bank" type, or some combination thereof.

Main memory scheduler 200 (FIG. 2A) includes store (also called "memory request store") 210 having a number of storage units 211A–211N (wherein A≦J≦N, N being the total number of storage units). The number of storage units N is selected, for example to ensure that (1) requests can be accepted by memory scheduler 200 faster than in the absence of store 210 (the speed necessary may depend on system requirements) and (2) sufficient requests are pending to eliminate the need for bubble cycles that are normally inserted whenever there are bank conflicts. In one implementation, there are 8 storage units (so that N=8), when accessing main memory 203 of 32 Mbytes implemented in 64 banks of Direct RDRAMs (16 banks in each device×4 devices), with each bank sharing sense amplifiers with at least one other bank.

Each storage unit 211J includes one or more storage elements, e.g. a storage element (also called "memory address storage element") 213J that holds the above-described memory address for a write request, or a read request. Each storage unit 211J also optionally includes, in addition to the above-described memory address storage element 213J, a valid storage element 214J in which is stored an active signal at the time of receipt of the memory address signal at store input port 212, thereby to indicate that the memory address stored in element 213J is yet to be issued to main memory 203. Each storage unit 211J also has an output bus 216J that carries signals held in one or more of storage elements 213J and 214J.

When a pending memory address is issued, memory request selector 220 stores an inactive signal in valid storage element 214J (e.g. via bus 226) thereby to indicate that storage unit 211J no longer contains a to-be-issued memory address. Therefore, in this embodiment, the signal in a valid storage element 214J is sufficient by itself to indicate the validity of the signal in the corresponding memory address storage element 213J. In this embodiment, each output bus 216J carries signals from each of the elements 213–215J and 218J.

In one embodiment, storage units 211A–211N are addressed in a cyclical fashion, wherein a pointer to a last storage unit 211N when incremented rolls over to first storage unit 211A, so that units 211A–211N are accessed in an endless loop by simply incrementing the pointer. For example, a three bit pointer can be used to endlessly loop around eight storage units 211A–211N.

Main memory scheduler 200 stores in each memory address storage element 213J the memory address of a to-be-accessed location in main memory 203, in the order of receipt (also called "first-in-first-out" (FIFO) order) of the corresponding memory requests at an input port (also called "stored-input port") 212 that is coupled to scheduler input port 201. For example, scheduler 200 simply increments the above-described pointer between successive store operations of memory addresses from successively received memory requests.

The FIFO order ensures the incoming requests are stored in the order received by main memory scheduler 200 and is useful when FIFO processing is performed under certain conditions as described below. However, scheduler 200 accesses the stored memory addresses in a random access manner, and normally selects (by driving a selection signal on an output port 221) a next memory address to be issued to main memory 203 in an order (also called "second order") different from the received order, e.g. to implement a scheme (such as bank conflict avoidance scheme).

Depending on the embodiment, each storage element 213J, 214J and 215J is implemented as one or more two-state (e.g. active/inactive state) storage locations preferably in a group of latches or a group of flip-flops, so that the signals stored therein can be accessed in parallel. If parallel access is not required, storage elements 213A–213N, 214A–214N and 215A–215N can be implemented in a static random access memory (abbreviated as SRAM).

Main memory scheduler 200 (FIG. 2A) further includes a memory request selector 220 that controls issuance of the pending memory requests by a multiplexer 230 to scheduler output port 202. Multiplexer 230 is controlled by selector 220 to pass the stored addresses and related requests to output port 202 in the second order unless certain predetermined conditions require FIFO processing (in the first order), e.g. (1) an earlier-received write request and a later-received read request both access the same location in memory 203, (2) one or more of the requests relate to configuration changes, (3) the number of pending write requests are greater than a predetermined threshold or (4) a write request has been pending for more than a predetermined time period (measured in number of cycles from receipt). In examples (3) and (4), FIFO processing as described herein frees up one or more of storage units 211A–211N in store 210, so that scheduler 200 can accept additional memory requests in the FIFO order.

For example, when a first bank 203I is being accessed, main memory scheduler 200 reviews the pending memory requests and issues a second request to a second memory bank 203K that is not coincident with first memory bank 203I, and not coincident with a low adjacent memory bank 203I−1 and not coincident with a high adjacent memory bank 203I+1. Therefore, in this example a scheduler 200 as described herein inserts, after an access to bank 203I and before another access to the same bank 203I or to one of adjacent banks 203I−1 and 203I+1 an access to a non-adjacent bank 203K, if pending. That is, after issuing a request to access the memory bank 203I, scheduler 200 issues a request to the memory bank 203K under any of the following conditions: if pending memory requests are to (1) banks 203I−1 and 203K, (2) banks 203I+1 and 203K, (3) banks 203I and 203K, (4) banks 203I, 203I−1 and 203K, (5) banks 203I, 203I+1 and 203K, or (5) banks 203I−1, banks 203I, banks 203I+1 and 203K.

Main memory scheduler 200 includes, in addition to the above-described memory request store 210 and memory request selector 220, multiplexer 230 that has a number of input ports (also called "multiplexer input ports") 231A–231N (wherein A≦J≦N, N being the total number of ports), an output port (also called "multiplexer output port") 232, and one or more selection lines (also called "multiplexer selection lines") 233.

Multiplexer input ports 231A–231N are coupled to memory address storage elements 213A–213N in memory request store 210, and multiplexer output port 232 is coupled to scheduler output port 202. The one or more multiplexer selection lines 233 are coupled to an output port 221 of memory request selector 220. Memory request selector 220 drives a selection signal on one or more terminals in port 221 that are coupled to the multiplexer selection line(s) 233, thereby to indicate to multiplexer 230 a specific one (also called "next memory address") of the storage units 211A–211N in memory request store 210 that is to be coupled to scheduler output port 202, for execution of an access request contained therein.

In one embodiment, main memory scheduler 200 (FIG. 2A) includes, in addition to the above-described memory request store 210, two additional stores, a write data store 242 (including write buffers 242A–242P) and a read data store 252 (including read buffers 252A–252M). Therefore, during a write operation, when multiplexer 230 passes a pending memory address from storage unit 211J to main memory 203, main memory scheduler 200 uses signal on bus 233 to select a corresponding one of write buffers 242J thereby to pass the data to be written to main memory 203. Similarly, during a read operation, when multiplexer 230 passes a pending memory address from storage unit 211J to main memory 203, main memory scheduler uses the signal on bus 233 to pass the data read from main memory 203 to a corresponding read buffer 252J.

In one implementation, write data store 242 and read data store 252 (FIG. 2A) are implemented using static random access memory (SRAM) that is coupled by a data address generator (not shown) that generates a select signal indicative of a storage location in the SRAM wherein data from main memory 203 is to be stored or is to be supplied (via the read data bus 204R or write data bus 204W respectively). In this implementation, read data store is implemented as a FIFO queue, wherein the data received from read data bus 204R is stored in order in read buffers 252A–252N. Note that the data on read data bus 204R is received after a certain time period (called "memory latency") in the same order as the order in which read requests were supplied to main memory 203 (on memory address bus 204M).

In another implementation, stores 242 and 252 are implemented as registers that are coupled by a multiplexer 241 (not shown) to main memory 203 (via memory interface 204). Such a multiplexer has a selection bus that is also coupled to output port 221 of memory request selector 220 in a manner similar or identical to selection bus 233 of multiplexer 230. Store 252 is organized in FIFO manner in this implementation.

The number M of read buffers 252A–252M (FIG. 2A) being the same as the number N of storage units 211A–211N is not a critical aspect of the invention. That is, M does not need to be equal to N. In one example, read store 252 has R read buffers 252A–252R, wherein R<N, and each read buffer 252J has associated therewith an identifier storage element that identifies the destination of the data stored in buffer 252J (as described below in reference to FIG. 4A). Similarly, the number R of write buffers 242A–242P being the same as the number N of storage units 211A–211N is not a critical aspect of the invention. When P<N as shown in the implementation (described below) illustrated in FIG. 4A, each write buffer 442J is identified by a write pointer storage element includes in each storage unit 411J.

In one embodiment, memory request selector 220 includes a bank conflict detector 222 that is coupled by selector input ports 223A–223N of selector 220 to storage units 211A–211N thereby to receive a pending address signal from each memory address storage element 213J. Bank conflict detector 222 also receives a current predetermined number K of address signals (wherein K is the number of interleaved requests that are currently supplied to main memory 203) via a bus 224 that is coupled to memory interface unit 204. Bank conflict detector 222 (FIG. 2B) compares at least a portion (e.g. "p" bank address bits) of each of the K current address signals with a corresponding portion (i.e. "p" bits) of each pending address signal held in a memory store 210, to determine a next address signal to be issued to main memory 203. Bank conflict detector 222 ensures that the next address signal does not cause bank conflicts with any of the current address signals, as described below (FIG. 2B).

Specifically, in one embodiment, memory 203 is implemented by a number of banks 203A–203M that share sense amplifiers as described above in reference to direct RDRAM. For a direct RDRAM, after a request (also called "transaction") to a bank 203I is issued, another transaction to the same bank 203I or to an adjacent bank 203I−1 or 203I+1 cannot be issued within a few cycles (e.g. 10 cycles). In such an embodiment, bank conflict detector 222 identifies one or more transactions, for example, to banks 203K, 203J and 203L that are not adjacent to banks 203I, for issuance immediately after the issuance of transaction to bank 203I so that bubble cycles need not be inserted (as would be required if a transaction to bank 203I+1 or 203I−1 or 203I immediately follows the transaction to bank 203I). Note that if there are no requests in store 210 that are pending for non-adjacent banks, bubble cycles are still inserted. Moreover, if a read request follows immediately after a write request, or vice versa, bubble cycles are inserted to avoid collisions on a common data channel used to access main memory 203.

Memory request selector 220 may include one or more circuits, e.g. an optimizer 227 (FIG. 2A), depending on the implementation. Specifically, in one embodiment, optimizer 227 selects, for issuance to main memory 203, read requests that are pending in store 210, prior to issuance of write requests, thereby to give higher priority to read requests (in a scheme "read bypass of write"), unless a read request and a write request (also called "earlier received write request") that was received prior to the read request access the same location in main memory 203. If the same location is being accessed, optimizer 227 resorts to first-in-first-out (FIFO) processing of the read and write request. Optimizer 227 is coupled (e.g. by bus 226 illustrated in FIG. 2A) to a type storage element 215J that indicates whether the request contained in storage unit 211J is a read request or a write request. Optimizer 227 can also implement other schemes, such as prioritization of read requests that originate from a pre-determined device (e.g. a display controller), thereby to ensure that the display controller is not stalled by earlier issued read requests (e.g. from the CPU). Note that optimizer 227 is not a critical aspect in one embodiment, because all requests are processed in an FIFO manner, by insertion of bubble cycles on detection of a conflict by bank conflict detector 222.

In one embodiment, bank conflict detector 222 (FIG. 2B) includes a number N of circuits (hereinafter "same/adjacent bank detector") 222A, 222N, i.e. equal in number to the number of memory address storage elements 213A–213N (discussed above). Each same/adjacent bank detector 222J has a first input bus 224 that is coupled to a register in the memory interface 204 (FIG. 2A) to receive therefrom the address of a currently issued request to main memory 203. Moreover, same/adjacent bank detector 222J also has a second input bus 241J (FIG. 2B) that is coupled to memory address storage element 213J via port 223J (discussed above).

Same/adjacent bank detector 222J can be implemented by a software process 260 (FIG. 2C) in a processor (not shown) or a state machine (not shown). Specifically, in process 260, detector 222J computes the address of a low adjacent bank 203I−1 (as illustrated by act 261 in FIG. 2C), and also computes the address of a high adjacent bank 203I+1 (as illustrated by act 262). Thereafter, detector 222J checks if a pending address in storage element 213J has the same bank address bits as the current bank to which a request is currently issued (as illustrated by act 263). If so, detector 222J sets (see act 268 in FIG. 2C) a flag (hereinafter "bank_conflict flag") to be TRUE, thereby to indicate that the pending address is not to be issued to main memory 203 in the next memory cycle.

If not, detector 222J checks (see act 264) if the bank at the pending address has the dependency flag set (indicating that the bank shares sense amplifiers with one or more adjacent banks). If not, detector 222J sets the bank_conflict flag to be FALSE (in act 267, illustrated in FIG. 2C). If dependency flag is set, detector 222J checks if a pending address in storage element 213J has the same bank address bits as the low adjacent bank (as illustrated by act 265), or as the high adjacent bank (as illustrated by act 266) that are both adjacent to the current bank.

If the result is false in each of acts 265 and 266, detector 222J sets the flag bank_conflict to be FALSE (in act 267).

Flag bank_conflict being FALSE indicates that the pending address is ready to be issued to main memory 203 (but is not necessarily issued, for example, depending on a prioritization scheme that may be implemented by an optimizer 227 described above in reference to FIG. 2A). Memory request selector 222 may issue such ready-to-be-issued requests in different orders, e.g. depending on various schemes, such as read bypass of writes as described herein.

Figure 3A:
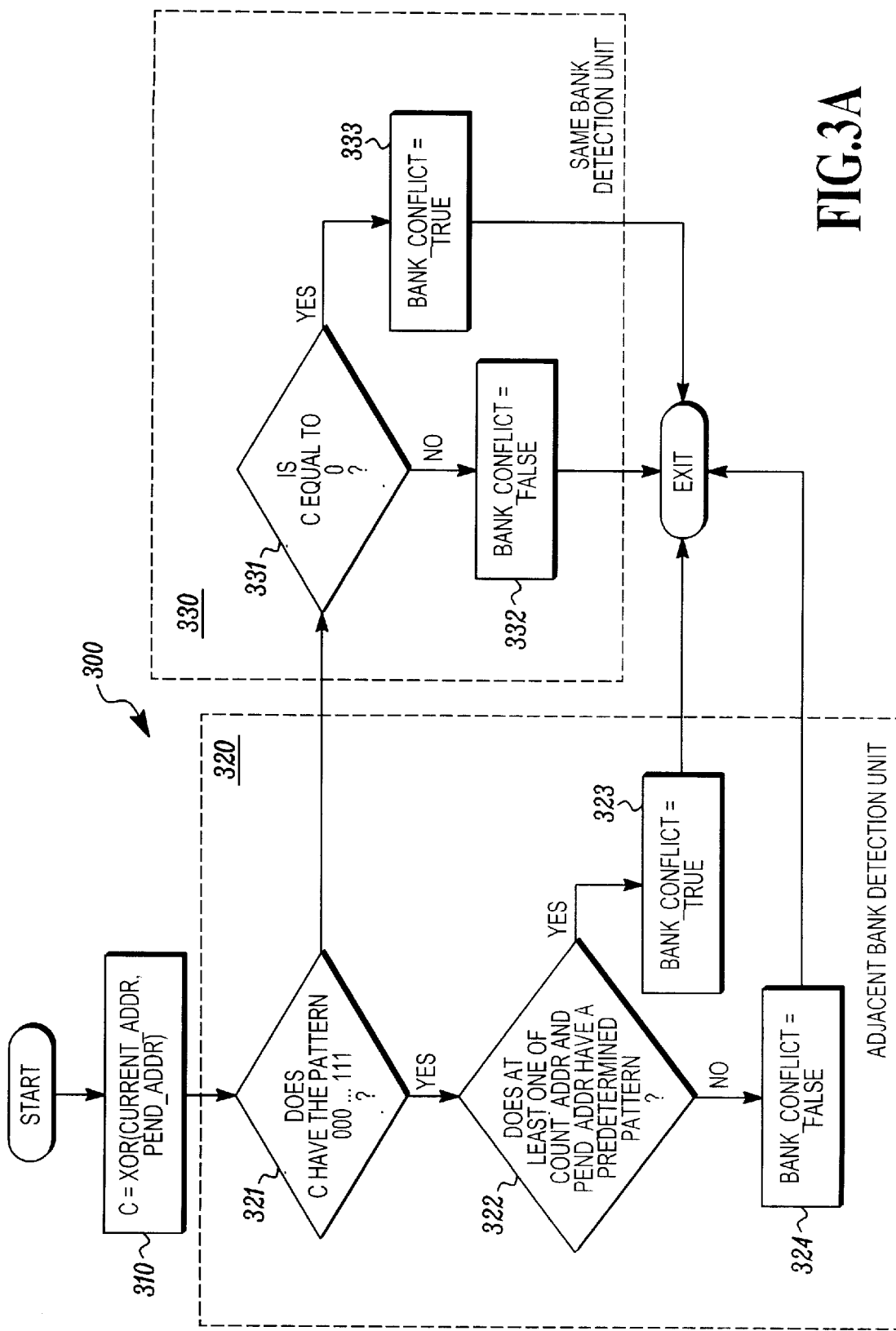
FIG. 3A illustrates, in a high level flowchart, acts performed by a circuit (also called "same/adjacent bank detector") 251J illustrated in FIG. 2B.

Note that although acts 261–267 have been described above as being performed by a processor, one or more of such acts can be performed by other circuitry. Another method for implementing the same/adjacent bank detector 222J is described below in reference to FIG. 3A.

In one embodiment, optimizer 227 (FIG. 2B) receives each of the bank_conflict flags generated by each of detectors 222A–222N and selects for issue to main memory 203 (FIG. 2A) a memory request that avoids conflict with another request that was previously issued and is currently being executed (also called "currently issued request"). Specifically, optimizer 227 implements a scheme (also called "bank conflict optimization") by issuing a second request to a second memory bank that is not coincident with (and preferably not adjacent to) a first memory bank that is being currently accessed.

Therefore, optimizer 227 interleaves among an original set of accesses to multiple adjacent banks 203I, 203I−1 and 203I+1, one or more later-received accesses to non-adjacent banks 203J, 203K and 203L, wherein bank 203I shares a sense amplifier with each of banks 203I−1 and 203I+1 (e.g. as described above in reference to direct RDRAMs). Although in the just-described embodiment, optimizer 227 performs the bank conflict optimization scheme, optimizer 227 can also perform additional schemes, such as the read bypass of write, in other embodiments (as described below in references to FIG. 4A).

Use of a bank conflict optimization scheme as described herein results in a significant improvement (e.g. more than two-fold) in the rate of data transfer to/from main memory 203 as illustrated in FIGS. 2D and 2E, and described below in reference to tables 1, 2 and 3.

TABLE 1

(Order of Receipt of Requests)

| Order of Receipt of Requests | Request Label | Bank Address |
|---|---|---|
| 0 | A | A |
| 1 | B | A + 1 |
| 2 | C | A + 2 |
| 3 | D | A + 3 |
| 4 | E | A + 4 |
| 5 | F | A + 5 |
| 6 | G | A + 6 |
| 7 | H | A + 7 |

TABLE 2

(See FIG. 2D)

| Order of Issue of Receipts | Request Labels | Time of Issue |
|---|---|---|
| 0 | A | T0 |
| 1 | B | T8 |

TABLE 2-continued (See FIG. 2D)

| Order of Issue of Receipts | Request Labels | Time of Issue |
|---|---|---|
| 2 | C | T16 |
| 3 | D | T24 |
| 4 | E | T32 |
| 5 | F | T40 |
| 6 | G | T48 |
| 7 | H | T56 |

TABLE 3

| Order that Requests are Issued | Label | Issue |
|---|---|---|
| 0 | A | T0 |
| 1 | B | T32 |
| 2 | C | T64 |
| 3 | D | T96 |
| 4 | E | T128 |
| 5 | F | T160 |
| 6 | G | T192 |
| 7 | H | T224 |

Figure 2A:
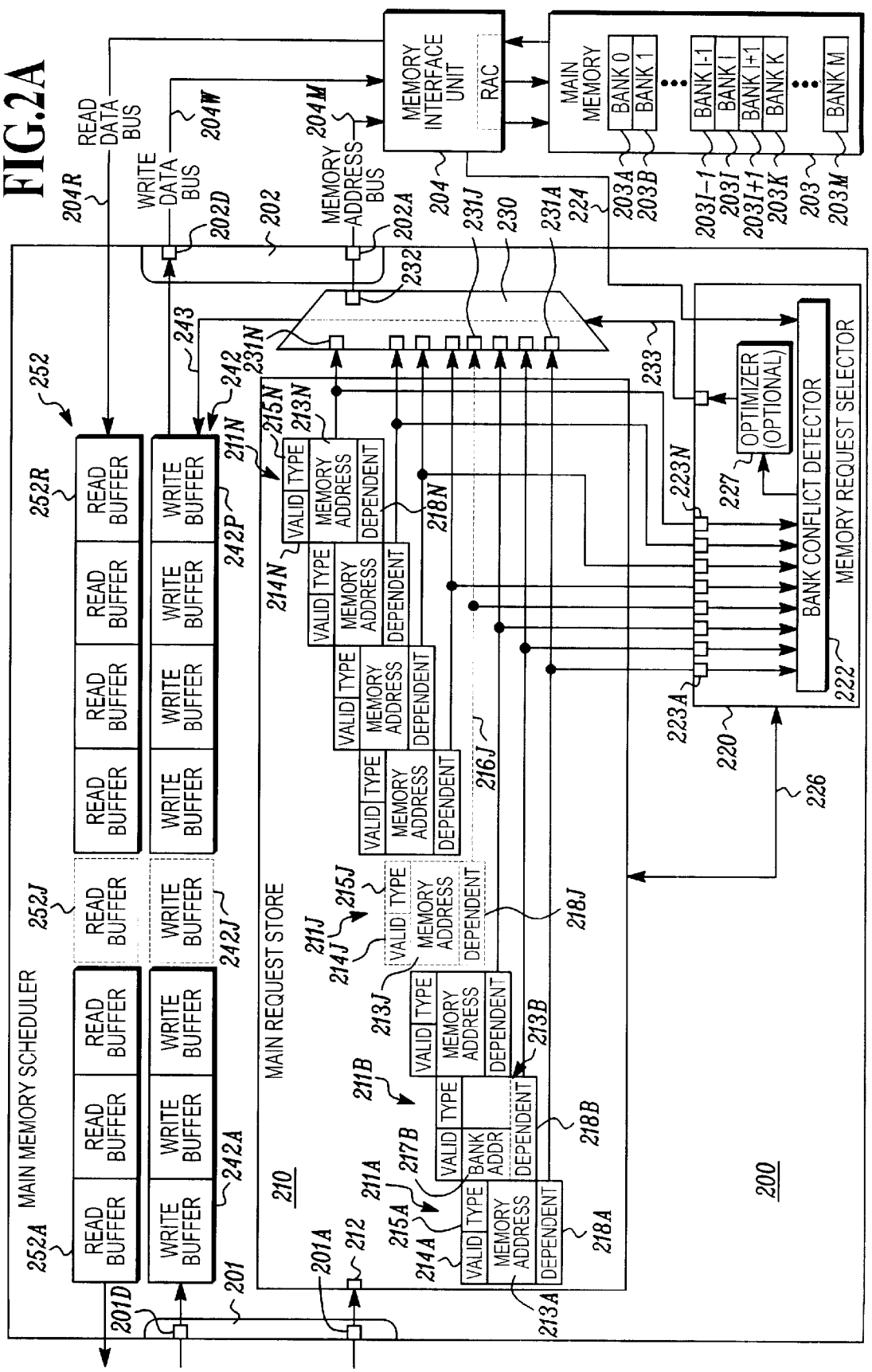
FIG. 2A illustrates, in a high level block diagram, a bank conflict detector of the invention included in a main memory scheduler for use in issuing requests to a main memory of the type illustrated in FIG. 1B.
Figure 2B:
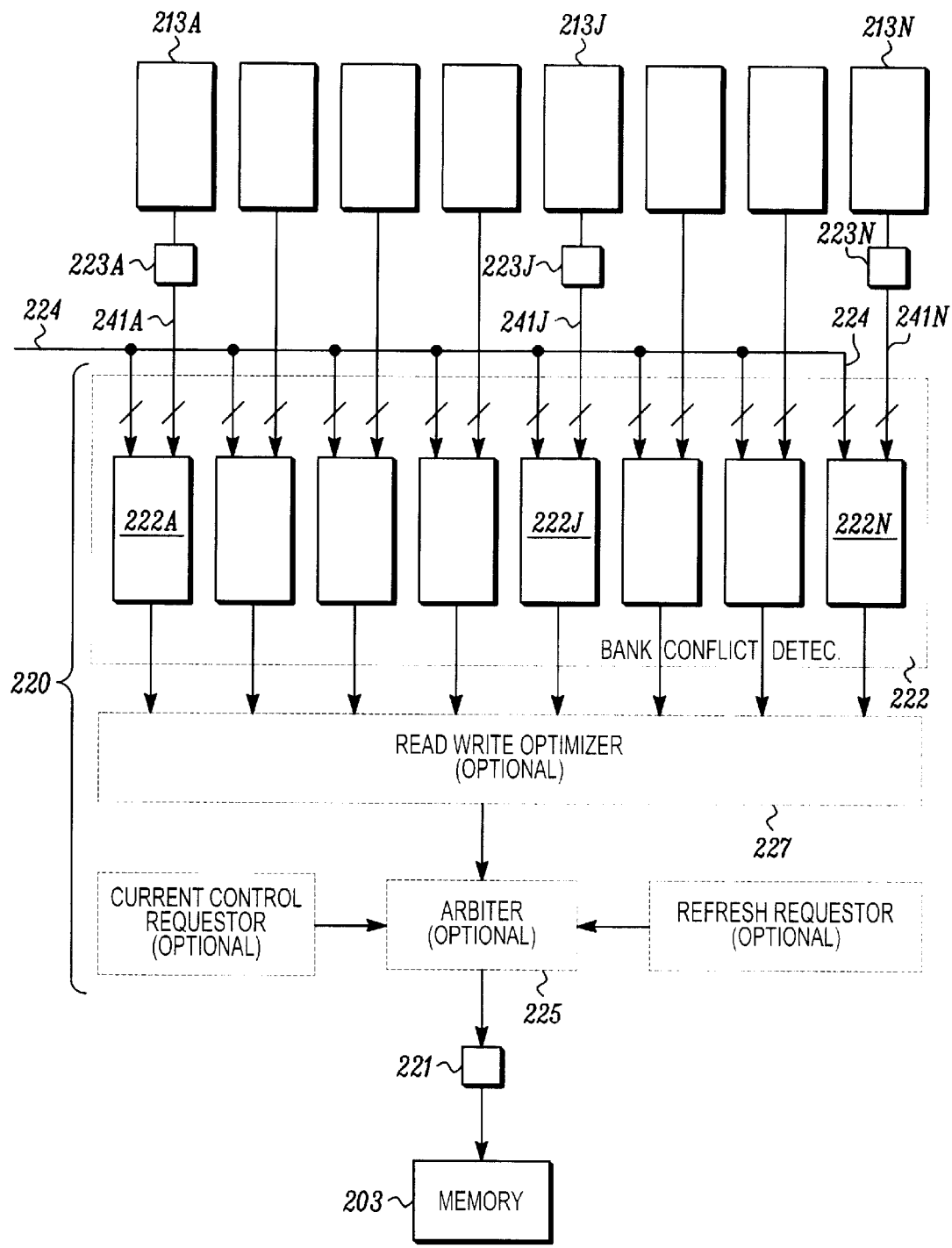
FIG. 2B illustrates, in an intermediate level block diagram, one embodiment of a bank conflict detector included in the scheduler of FIG. 2A.

Therefore, as illustrated in FIG. 2D, no bandwidth remains unused or wasted even when successive requests received by scheduler 200 (FIG. 2A) are to two adjacent banks 203I and 203I+1 for the following reasons. Scheduler 200 issues, out of order, a request to a distant bank 203K, although the issued request is received later than two successive requests to adjacent banks 203I and 203I+1.

Note that, in this example, an entire 32-byte cache line is retrieved during each access, in four packets from a single bank 203I. Such interleaving of accesses to memory addresses eliminates the bubble cycles illustrated in FIG. 2E (see FIG. 2D wherein there are no bubble cycles).

In one embodiment, same/adjacent bank detector 222J implements a method 300 (FIG. 3A) that uses a pending address and a current address in a manner similar to that described above in reference to FIG. 2C. Specifically, in operation 310, same/adjacent bank detector 222J obtains a value "c" by performing an exclusive OR operation on two addresses, one of the addresses being identified by a pending request and the other of the addresses being identified by an issued request. Thereafter, in an operation 320 detector 222J uses the value c and the two addresses to determine whether a bank conflict arises from adjacent banks (in case of dependent banks), or from the same bank (irrespective of whether or not the banks are dependent).

Specifically, in operation 320, detector 222J checks, in act 321, whether the value c has the pattern of a number of consecutive 1s in the least significant bits and a number of consecutive 0s in the most significant bits. If so, detector 222J goes to act 322 and checks if at least one of the two addresses has a predetermined pattern (e.g. such as the just-described pattern). If so, detector 222J goes to act 323 and sets flag bank_conflict to be TRUE, and otherwise goes to act 324 and sets the flag bank_conflict to FALSE. In act 321, if the value c does not have the just-described pattern, detector 222J performs operation 330. Specifically, in act 331, detector 222J checks if the value c is equal to 0. If so, detector 222J goes to act 333 and sets the flag bank_conflict to TRUE, and otherwise goes to act 332 and sets the flag to FALSE.

Figure 3B:
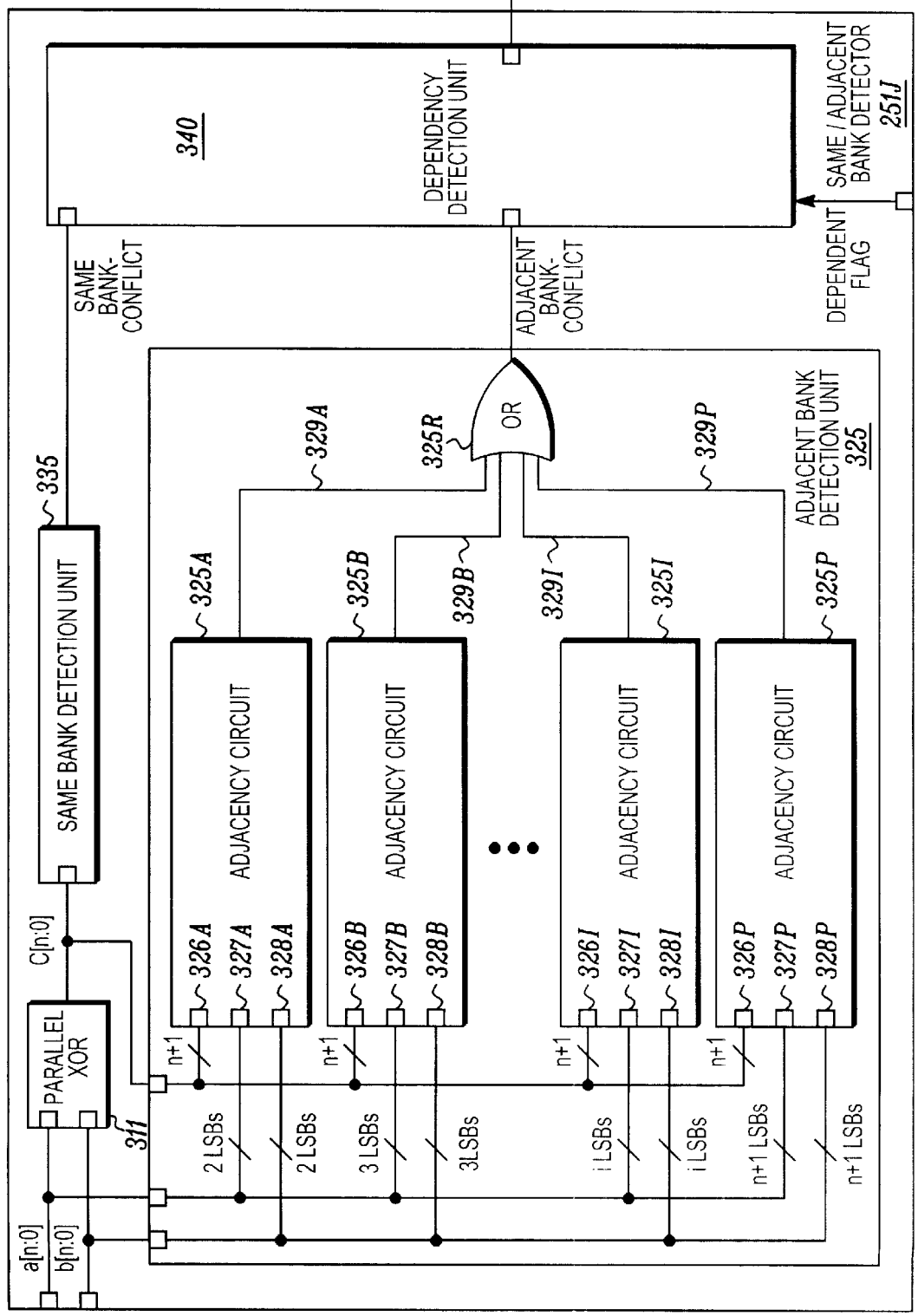
FIG. 3B illustrates, in an intermediate level block diagram, one embodiment of a same/adjacent bank detector 251J illustrated in FIG. 2B.

In one implementation, same/adjacent bank detector 251J includes a circuit 311 (FIG. 3B) that receives the two address signals, and performs an exclusive OR operation 310 (described above in reference to FIG. 3A). Circuit 311 supplies the value c [n:0] to each of detection units 325 and 335 that respectively perform operations 320 and 330 described above in reference to FIG. 3A. Each of detection units 325 and 335 supply the resultant bank_conflict flags (also referred to as adjacent bank_conflict flag and same bank_conflict flag respectively) to a dependency detection unit 340. Dependency detection unit 340 also receives another flag (hereinafter "dependent flag") from the respective storage unit 211J (specifically, from a dependent storage element 218J included therein as illustrated in FIG. 2A).

The dependent flag in storage element 218J when set indicates that the memory address in storage element 213J identifies a bank 203I that shares a sense amplifier with at least one other bank. Dependency detection unit 340 simply passes the signal from same bank detection unit 335 as the bank_conflict signal on line 341 if the dependent flag is not set (i.e. indicating that the bank is of the "independent type"). Alternatively, if the dependent flag is set, dependency detection unit 340 ORs the two flags from detection units 325 and 335, and supplies the resultant signal as flag bank_conflict on output line 341.

Figure 3C:
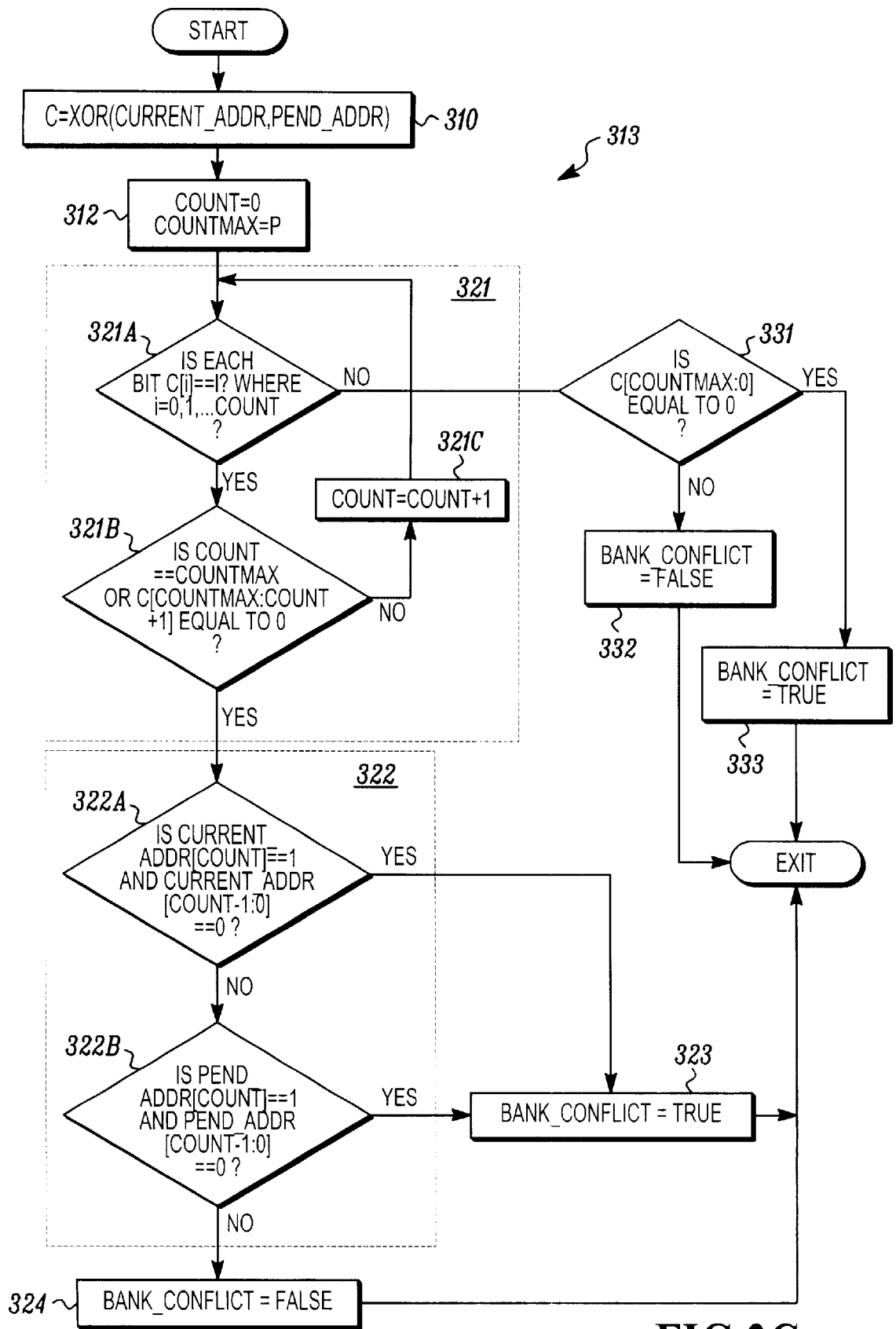
FIG. 3C illustrates, in an intermediate level flowchart, acts performed by the same/adjacent bank detector 251J illustrated in FIG. 3B.

In one implementation of operation 320, same/adjacent bank detector 222J performs acts 321 and 322 (FIG. 3C) by performing the respective subacts 321A–321C and 322A–322B. In subact 321A, same/adjacent bank detector 222J checks if each bit of the XOR result, e.g. that $c[i]$ is equal to 1, wherein i is any one of 0 ... count, and count takes any value between 0 and p−1, wherein p is the total number of bits of the bank address. Next, in subact 321B, same/adjacent bank detector 222J checks if the count is equal to count max (which has been previously initialized to the maximum number of bits p or if the value c [count max: count+1] is equal to 0. If either of the conditions is true, same/adjacent bank detector 222J goes to act 322.

In act 322, same/adjacent bank detector 222J checks (in subact 322A) if the bit at the count position of the current address is and also checks if the bits between positions 0 and count −1 of the current address are 0. If so, same/adjacent bank detector 222J goes to act 323 (described above). If not, same/adjacent bank detector 222J checks (in subact 322B) if the bit at the position count in the pending address is 1, and if all the bits at positions 0 to count −1 in the pending address are 0. If so, same/adjacent bank detector 222J again goes to act 323, and otherwise goes to act 324 (described above). In subact 321A, if any of bits at a position i of value c are not 1, samne/adjacent bank detector 222J goes to act 331 (described above).

In method 313 (FIG. 3C), same/adjacent bank detector 222J sets the flag bank_conflict to be TRUE, irrespective of whether the two banks are adjacent or coincident. Note that method 313 can be modified to check the dependency flag so that when the two banks are adjacent but the dependency flag is false, the signal bank_conflict is driven inactive.

Method 313 also detects adjacent or coincident banks in a "64 bank" implementation of memory 203 in the manner described herein. For example, method 313 sets the flag bank_conflict to be true if the exclusive OR operation results in one of the following bit patterns when the banks are coincident or adjacent: 000000 (when the two banks are coincident), 000001 or 000011 (and either one of the two addresses has 01 as the two least significant bits), 000111 (and either one of the two addresses has 011 as the three least significant bits), 001111 (and either one of the two addresses has 0111 as the four least significant bits), 011111 (and either one of the two addresses has 01111 as the five least significant bits), and 111111 (and either one of the two addresses has 011111 as the six least significant bits).

Note that the addresses a and b that are being used in operation 310 include the device identifier. Therefore, requests (also referred to as "transactions") for banks A and B are conflicting if the device identifier of bank A is equal to the device identifier of bank B, and bank A is the same as bank B, or same as bank B+1, or the same as bank B−1 (wherein the request to bank B has already been issued and request to bank A is about to be issued). Note also that banks B+1 and B−1 are compared to bank A only if bank B shares sense amplifiers with banks B−1 and B+1.

In one embodiment, adjacent bank detection unit 325 (FIG. 3B) includes a number of adjacency circuits 325A–325P, each adjacency circuit 325I having a group of input terminals 326I that are coupled to circuit 311 to receive therefrom all n+1 bits of the value c. Each adjacency circuit 325I also has input terminals 327 and 328 that respectively receive i number of bits of addresses a and b, with i changing sequentially from one circuit to the next. Each adjacency circuit 325I also has an output line 329I that is coupled to OR gate 325R that combines the signals from each of circuits 325A–325N to generate an adjacent bank_conflict signal (that is supplied to dependency detection unit 340).

Figure 3D:
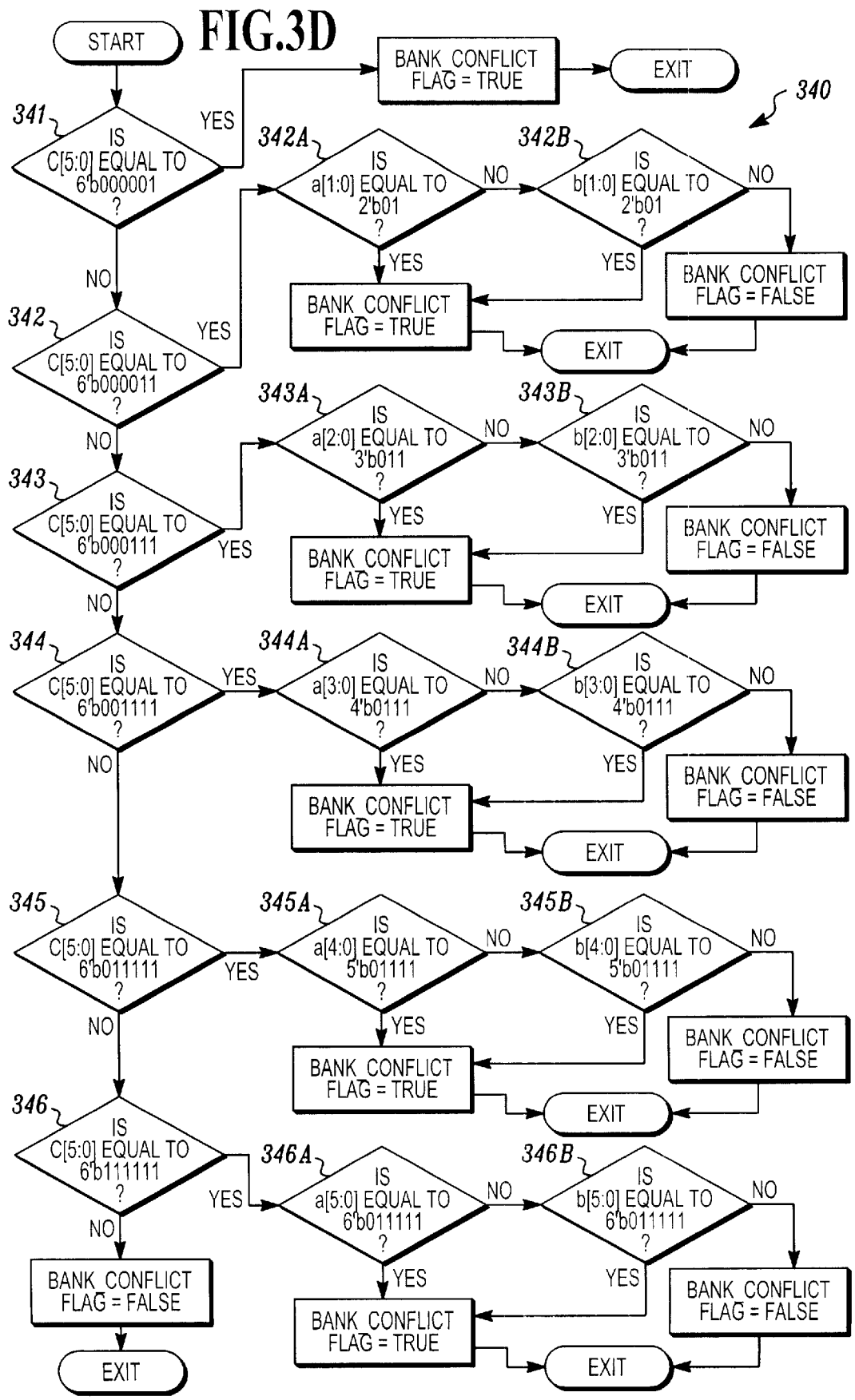

In one implementation, adjacent bank detection unit 325 (FIG. 3B) performs process 340 (FIG. 3D), wherein banks 203A–203M are 64 in number, and are addressed by 6 bank address bits of the memory address, i.e. $2^p$ equal to 64, and p equal to 6. Specifically, in act 341, unit 325 checks if the 6 bits are equal to 6'b000001 and if so sets the flag bank_conflict to TRUE. Otherwise, unit 325 goes to act 342 and repeats the just-described check, except that the predetermined pattern being checked is 6'b000011. That is, the pattern used in act 342 has two '1' bits, as opposed to the pattern used in act 341. If the pattern matches, unit 325 checks if two bits of either of the two addresses match the predetermined pattern 2'b01 (see acts 342A and 342B). If so, unit 325 sets the flag bank_conflict to TRUE, and otherwise sets flag bank_conflict FALSE.

In this manner, unit 325 repeats the check in each of acts 343, 344, 345 and at 346 with each of a number of predetermined patterns that have sequentially increasing number of 1s. In the corresponding acts 343A–346A and 343B–346B, unit 325 also checks for predetermined patterns that have an increasing number of 1s.

Figure 3E:
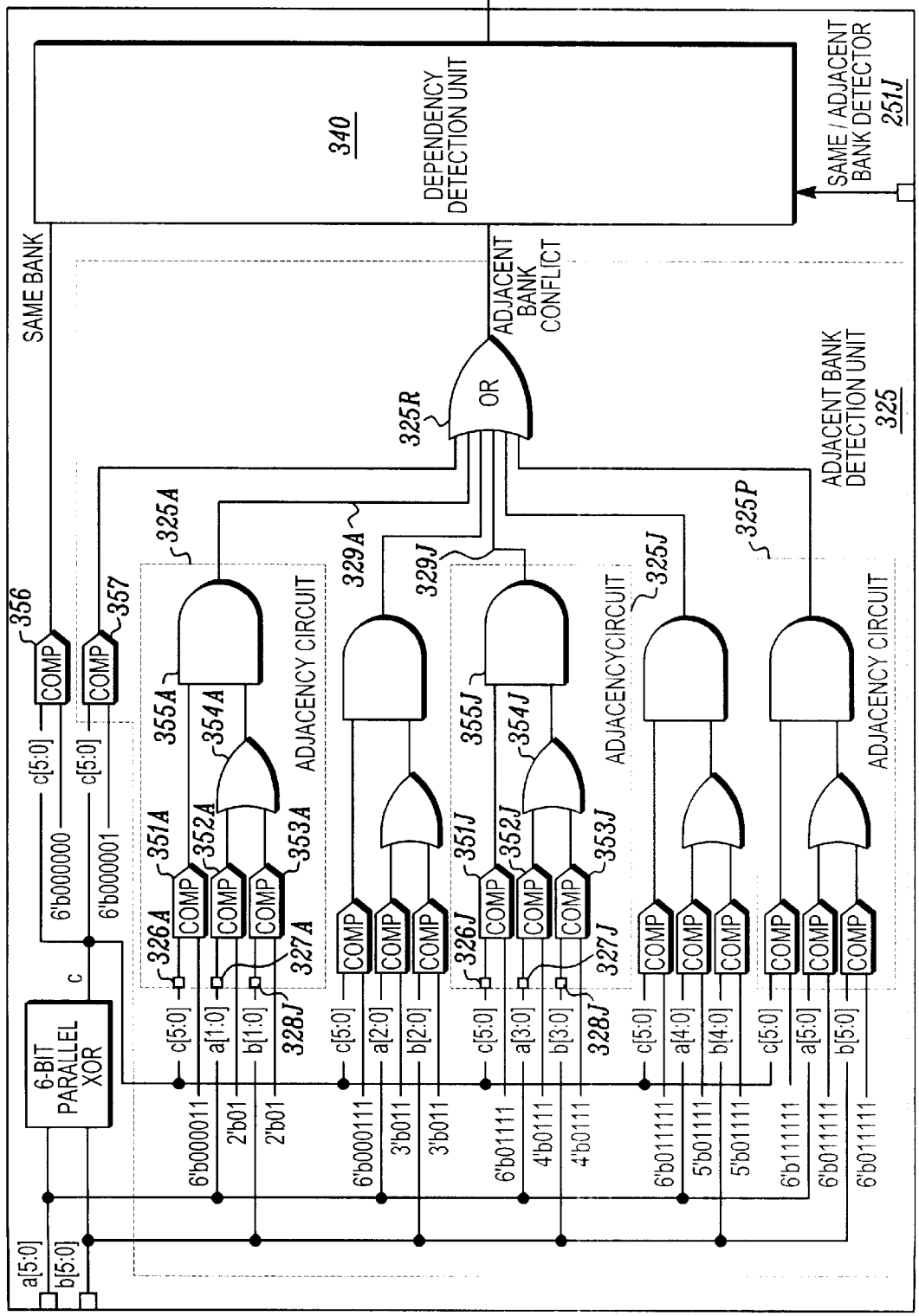
FIGS. 3E and 3G illustrate, in a low level block diagram, circuitry for implementing the flowcharts illustrated in FIG. 3D and FIG. 3F respectively.

Process 340 can be implemented by adjacent bank detection unit 325 (FIG. 3E). Specifically, in the implementation, unit 325 includes in adjacency circuit 325J (described above) having three comparators 351J, 352J and 353J that are respectively coupled to input terminals 326J, 327J and 328J that in turn respectively carry the signals c, a and b. Comparators 351J, 352J and 353J compare the respectively received signals with the predetermined patterns (as described above in reference to FIG. 3B). Each of comparators 351J, 352J and 353J are coupled to logic gates, such as AND gate 355J and OR gate 354J to implement the logic described above in reference to FIG. 3D, e.g. to generate the value of flag bank_conflict at an output line 329J of adjacency circuit 325J.

Adjacent bank detection unit 325 is described above in reference to FIGS. 3D and 3E as using six bank address bits, although any number of such bits may be used in other implementations. If fewer bits are used (e.g. 4 bits are used for bank address) the unused bits (e.g. 2 bits) are set to zero by an address maper 480 as described below in reference to FIGS. 4A and 4B in one specific embodiment. Note that in the just-described implementation of unit 325 (FIG. 3E), a single comperator 357 is used to implement act 341 (described above in reference to FIG. 3D), that checks whether value c is equal 6'b000001. Moreover, in this implementation, same bank detection unit 335 (FIG. 3B) is implemented by another single comperator 356 (FIG. 3E) that compares the value c with the predetermined pattern 6'b000000.

Figure 3F:
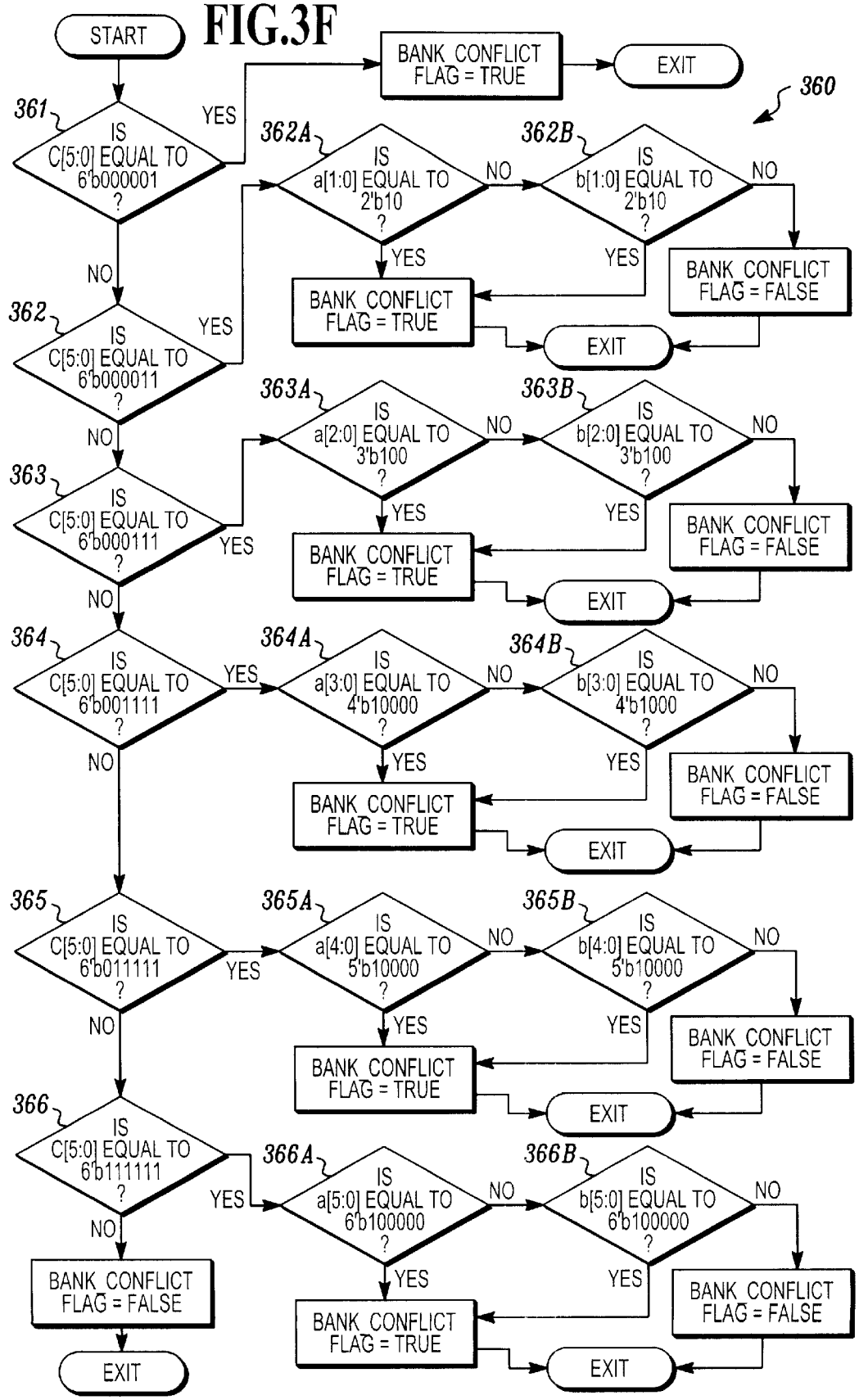
Figure 3G:
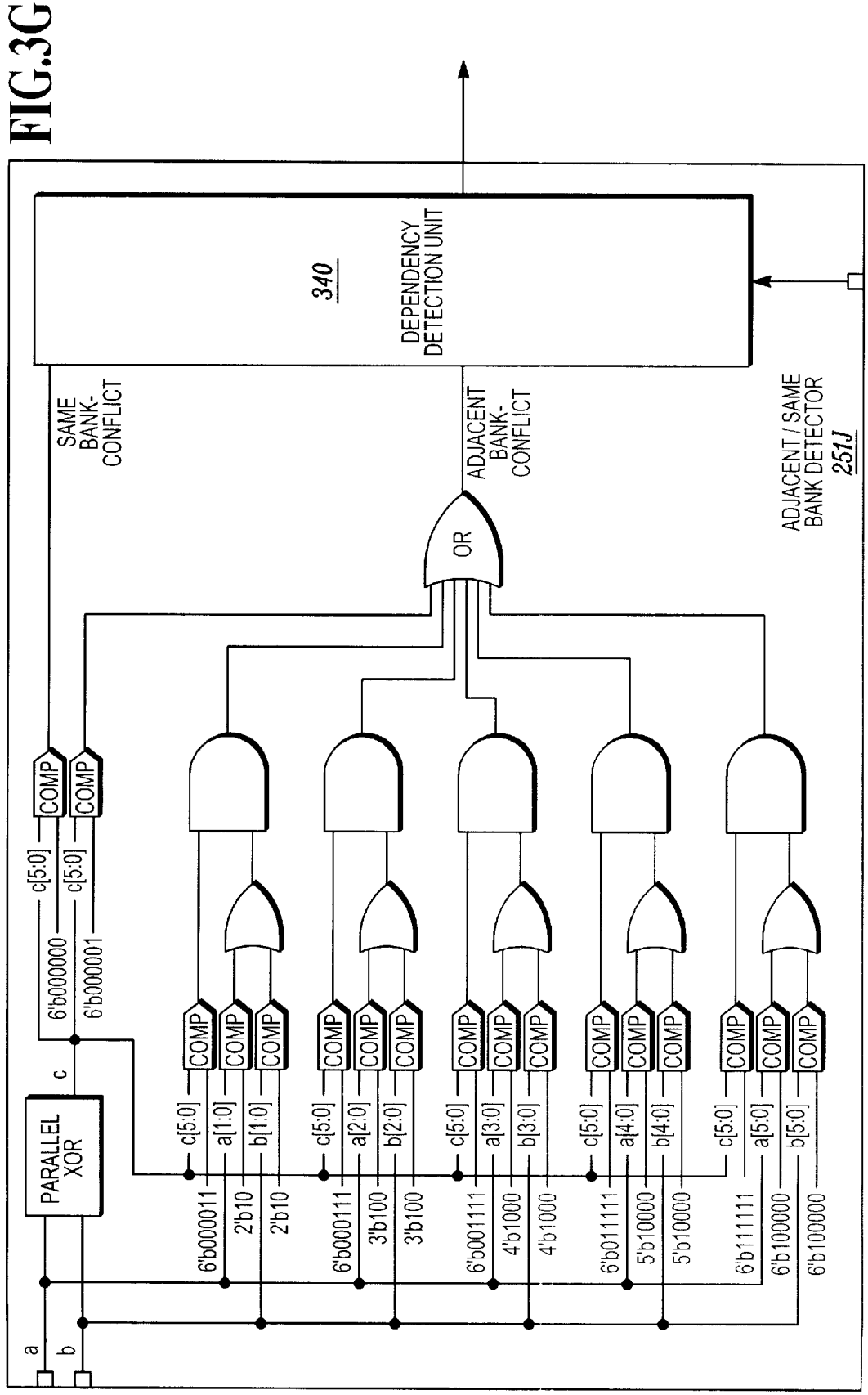
Figure 3H:
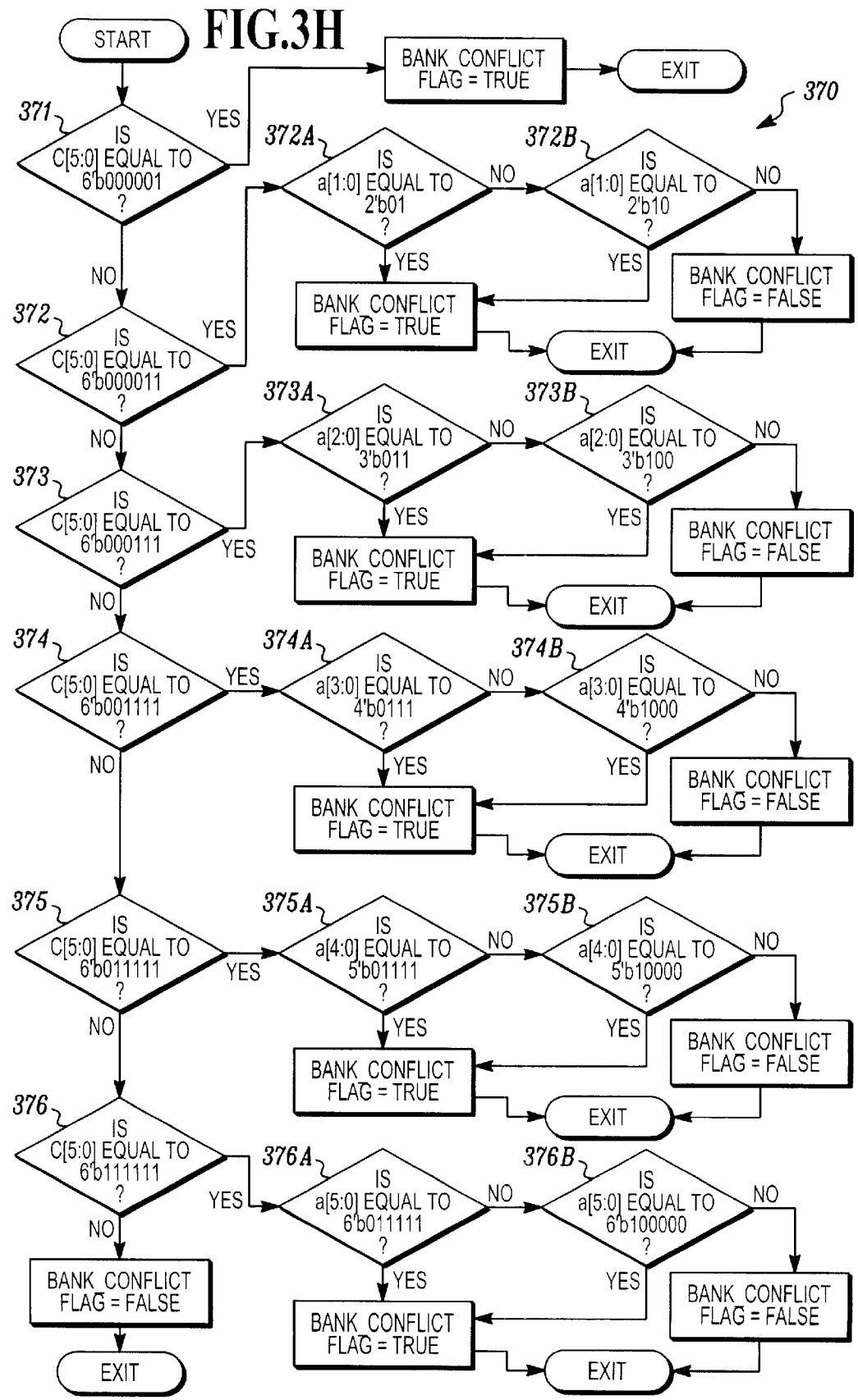
Figure 31:
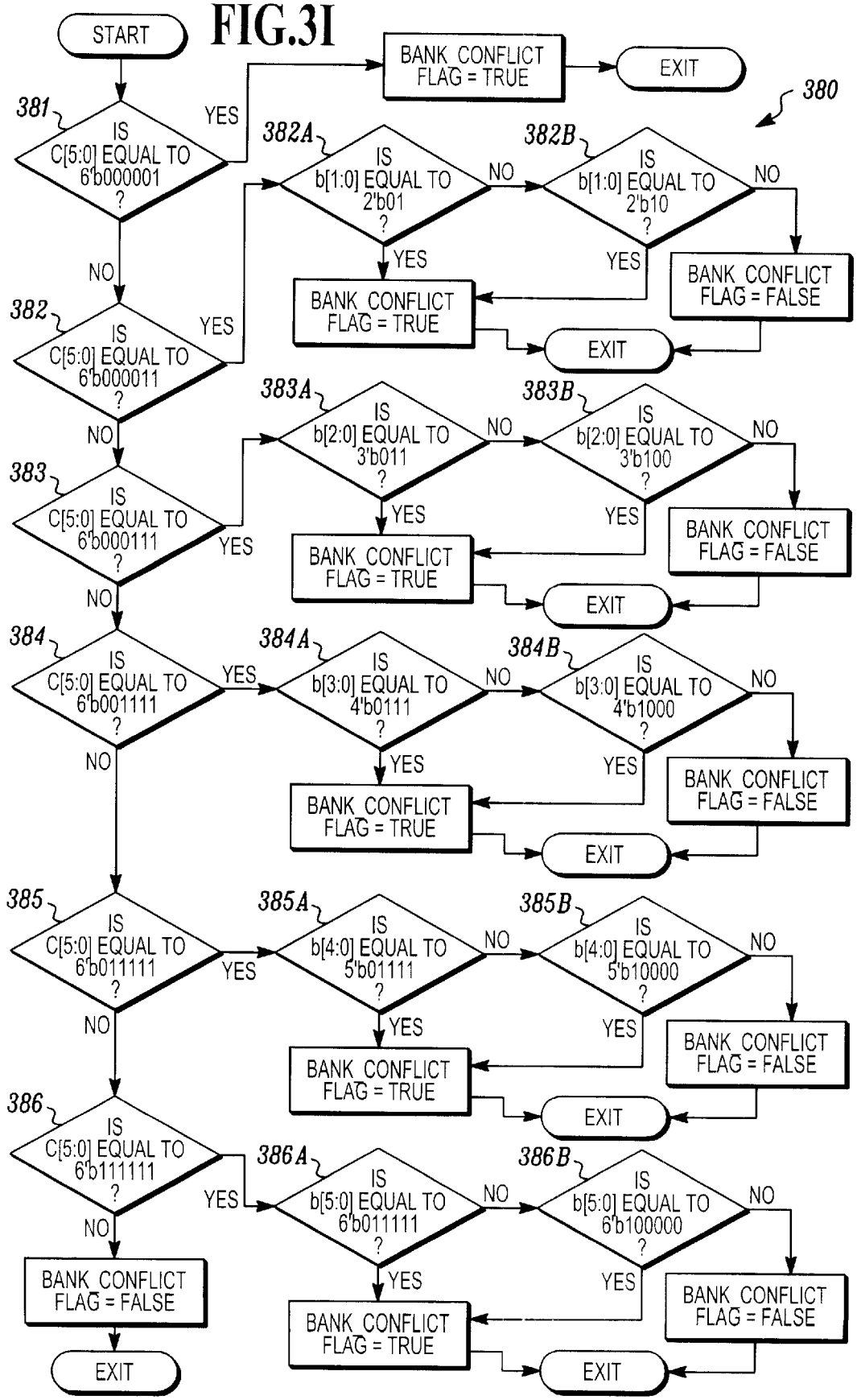

In another implementation unit 325 (FIG. 3B) performs process 360 (FIG. 3F) that is similar or identical to process 340 described above in reference to FIG. 3D. Specifically, acts 361–366 are identical to acts 341–346 described above. Acts 362A–366A are similar to acts 342A–346A except that the predetermined patterns used in acts 362A–366A are different. Specifically, the patterns used in acts 362A–366A are different from the predetermined patterns used in acts 342A–346A. For example, in act 362A the predetermined pattern is 2'b10 instead of the pattern 2'b01 used in act 342A. Similarly, in act 366A, unit 325 uses the predetermined pattern 6'b100000 instead of the pattern 6'b011111 used in act 346A. Moreover, the structure of circuitry used to implement the same/adjacent bank detector 251J as illustrated in FIG. 3G for a process 360 (FIG. 3F) is identical to the circuitry illustrated in FIG. 3E, except for the predetermined patterns as described above.

Although two specific implementations of unit 325 have been described above in reference to FIGS. 3B and 3F, many other implementations will be apparent to the skilled person in view of the disclosure. For example, in another implementation, unit 325 performs the process 370 that performs acts similar to those described above in reference to processes 340 and 360. Specifically, acts 371–376 are identical to the corresponding acts 341–346 described above. Moreover, acts 372A–376A are identical to the above-described acts 342A–346A. Furthermore, acts 372B–376B compare the same signals that were compared in the corresponding acts 372A–376A, but two are different predetermined pattern.

Specifically, in act 372B, unit 325 compares the two least significant bits of address signal a that were also compared in act 372A, except that in act 372B the predetermined pattern 2'b10 is used instead of the pattern 2'b01 used in act 372A. Similarly, in act 376B, the six least significant bits of the address signal a (that are identical to the corresponding 6 bits of address signal a used in act 376A) to the predetermined pattern 6'b100000 instead of the predetermined pattern 6'b011111 used in act 376A. Process 380 (FIG. 3I) is identical to the above-described process 370 except that only the address signal b is used instead of the address signal a used in process 370. In each of implementations 3H and 3I, an adjacency circuit 325I (FIG. 3B) has only two sets of input terminals, e.g. input termina 328I, because only one of address signals a and b is used.

If bank conflict detector 222 (FIG. 2A) finds that each of the memory addresses in stores 211A–211N results in a bank conflict, then no request is issued to memory 203 in the current cycle, and memory request selector 220 waits until the next cycle, thereby to insert a "bubble cycle". In the next cycle, if no additional requests are received, and if flag bank_conflict continues to be true (e.g. because the issued requests are still being executed), selector 220 continues to wait for the next cycle, thereby inserting another bubble cycle. Therefore, memory request selector 220 issues a next request that is delayed until after a previously issued request is completed by memory 203, when all the requests in store 210 result in a bank conflict.

Figure 3J:
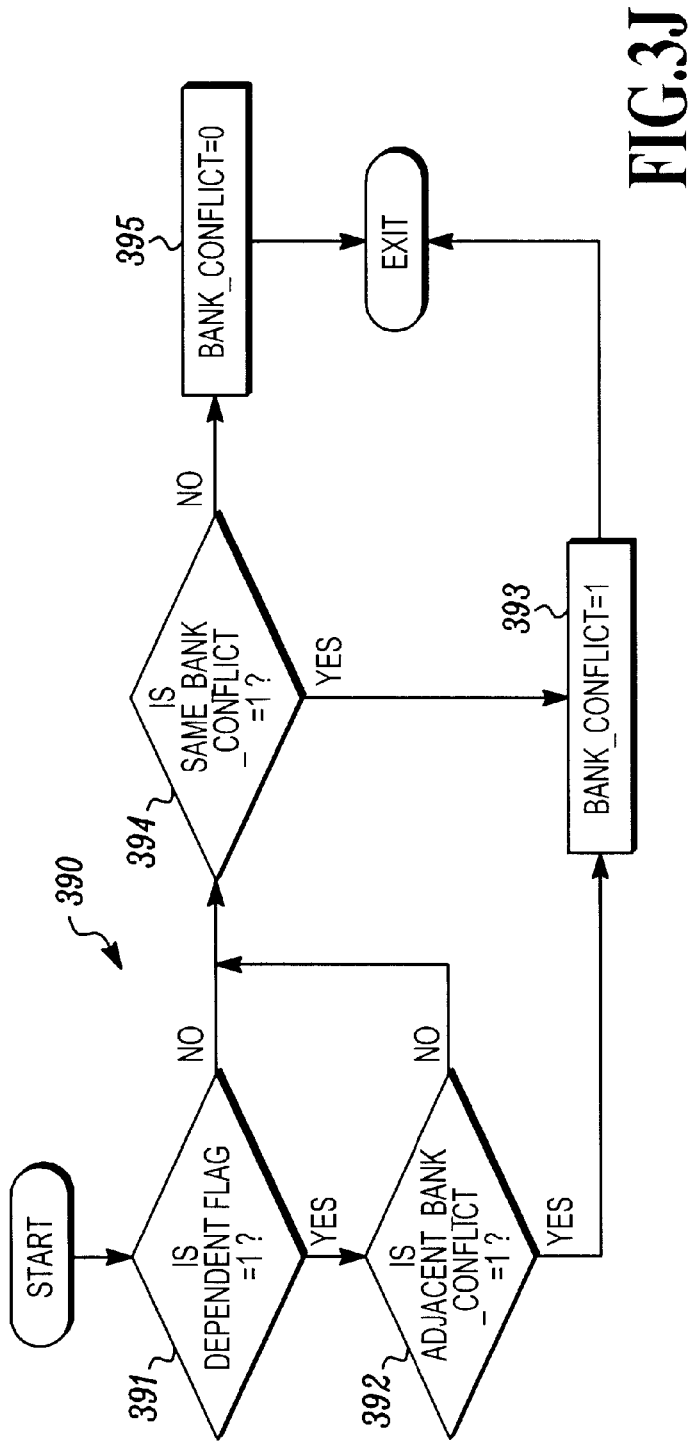
FIGS. 3J and 3K illustrate, in a flow chart and a circuit schematic respectively, one embodiment of a dependency detection unit 340 illustrated in each of FIGS. 3B, 3E and 3G.
Figure 3K:
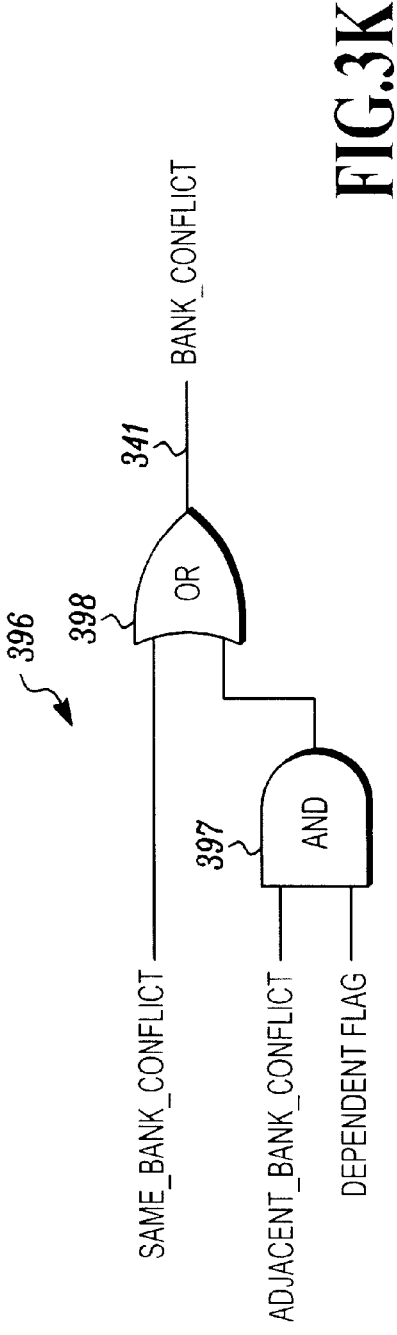

In one embodiment, dependency detection unit 340 (FIGS. 3B, 3E and 3G) performs acts 391–395 of a method 390 (FIG. 3J) to determine the value of bank_conflict. Specifically, in act 391, unit 340 checks if the dependent flag is set and if so, goes to act 392 and otherwise goes to act 394. In act 392, unit 340 checks if the signal adjacent_bank_conflict is active and if so, goes to act 393 and otherwise goes to act 394. In act 393, unit 340 drives the signal bank_conflict active. In act 394, unit 340 checks if the signal same_bank_conflict is active and if so, goes to act 393 (described above), and otherwise goes to act 395 and drives and signal bank_conflict inactive. Unit 340 is implemented in one example by a circuit 396 (FIG. 3K), wherein a line carrying the signal adjacent_bank_conflict and another line carrying the signal dependent_flag are coupled to the input terminals (not labeled) of an AND gate 397 that has an output terminal coupled to an input terminal (also not labeled) of an OR gate 398. Another input terminal (also not labeled) of OR gate 398 is coupled to a line carrying the signal same_bank_conflict, and an output terminal of OR gate 398 is coupled to line 341 that carries the signal bank_conflict.

Moreover, in one implementation, selector 220 (FIG. 2A) waits until the last possible moment before selecting a next request to be issued, so that every cycle there are a maximum number of requests to choose from. For example, one or more additional requests may be received immediately prior to the selection, thereby get included among the requests being considered for selection. Specifically, if additional requests are received and held in store 210, selector 220 performs the operations illustrated in FIG. 3A on the additional requests as well, so that a non-conflicting request in storage unit 211J if available is issued.

If a number of memory addresses are non-conflicting, the address that is issued next can be selected by any method, for example randomly or in the order of receipt (FIFO processing). In one implementation, an optional optimizer (also called "read write optimizer") 227 illustrated in FIG. 2B selects one of such addresses for issuance to memory 203. Moreover, in addition to a read request or a write request, other types of requests may be issued to memory 203, such as an internally-generated control request from hardware, such as a current control requester or a refresh requestor. In such an embodiment, an optional arbiter may be used to select one of the different kinds of requests for issuance to memory 203 as described below in reference to FIGS. 4A and 4B.

Figure 4A:
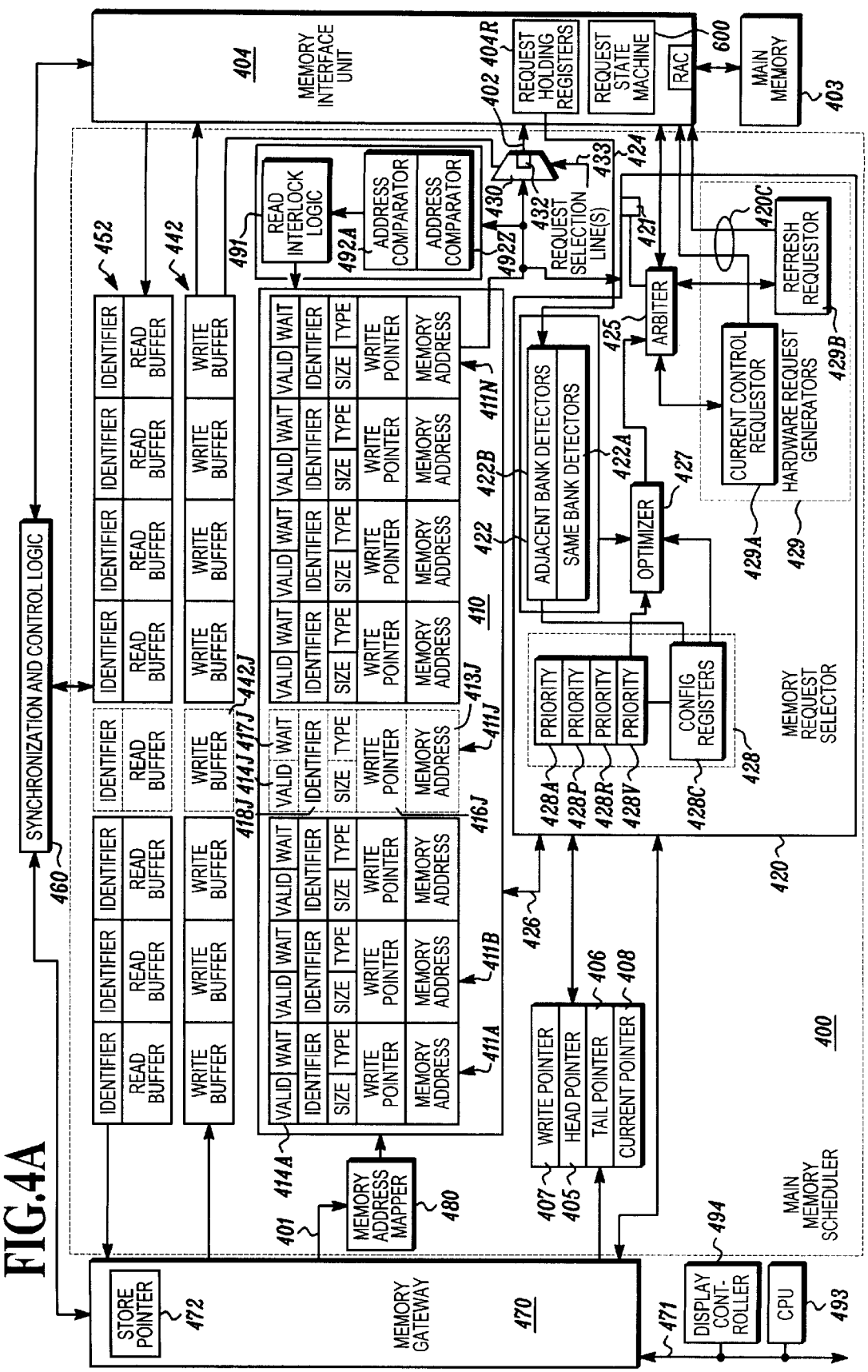
FIGS. 4A and 4B illustrate, in high level block diagrams, alternative embodiments of a main memory scheduler in accordance with the invention.
Figure 4B:
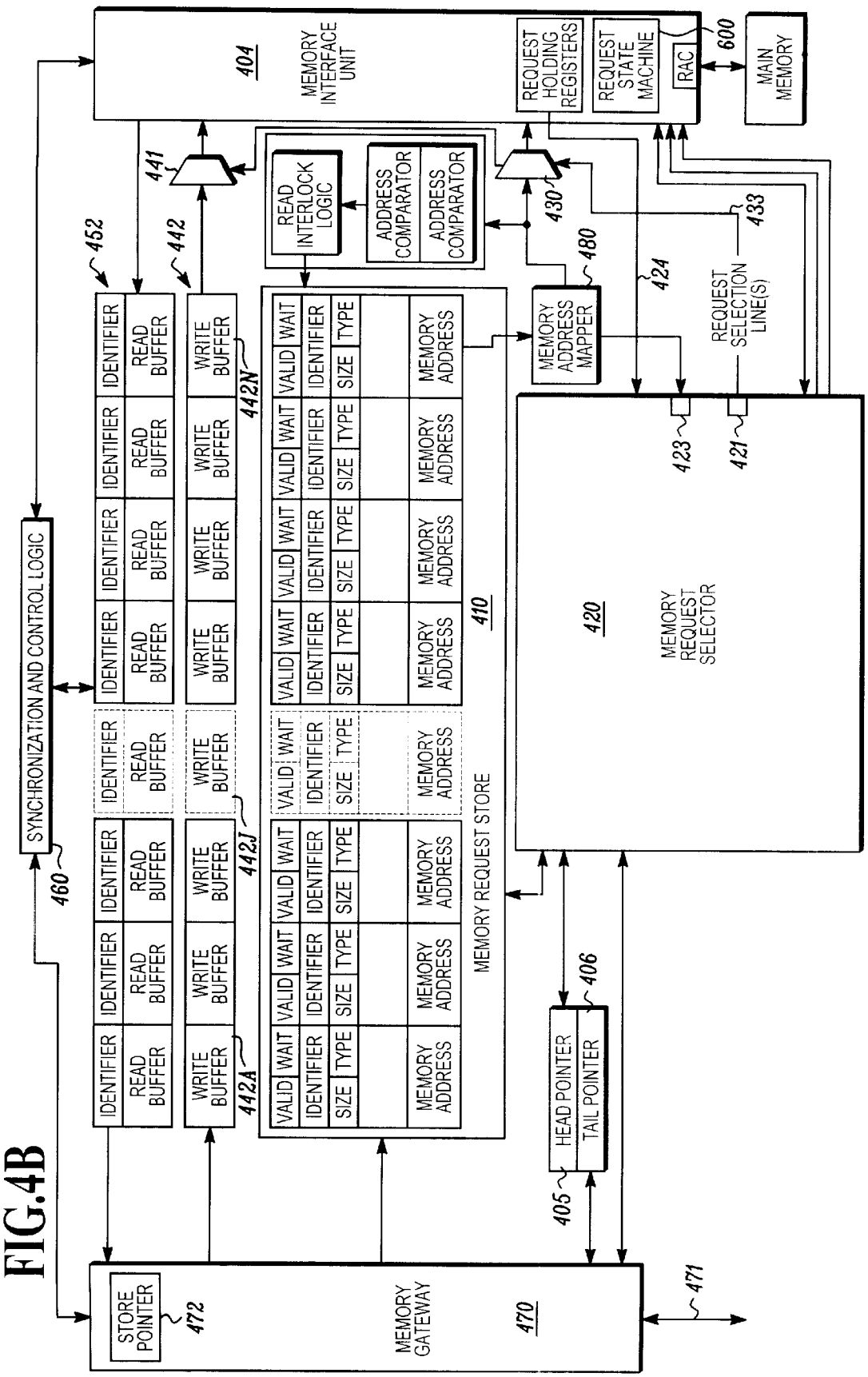
Figure 4C:
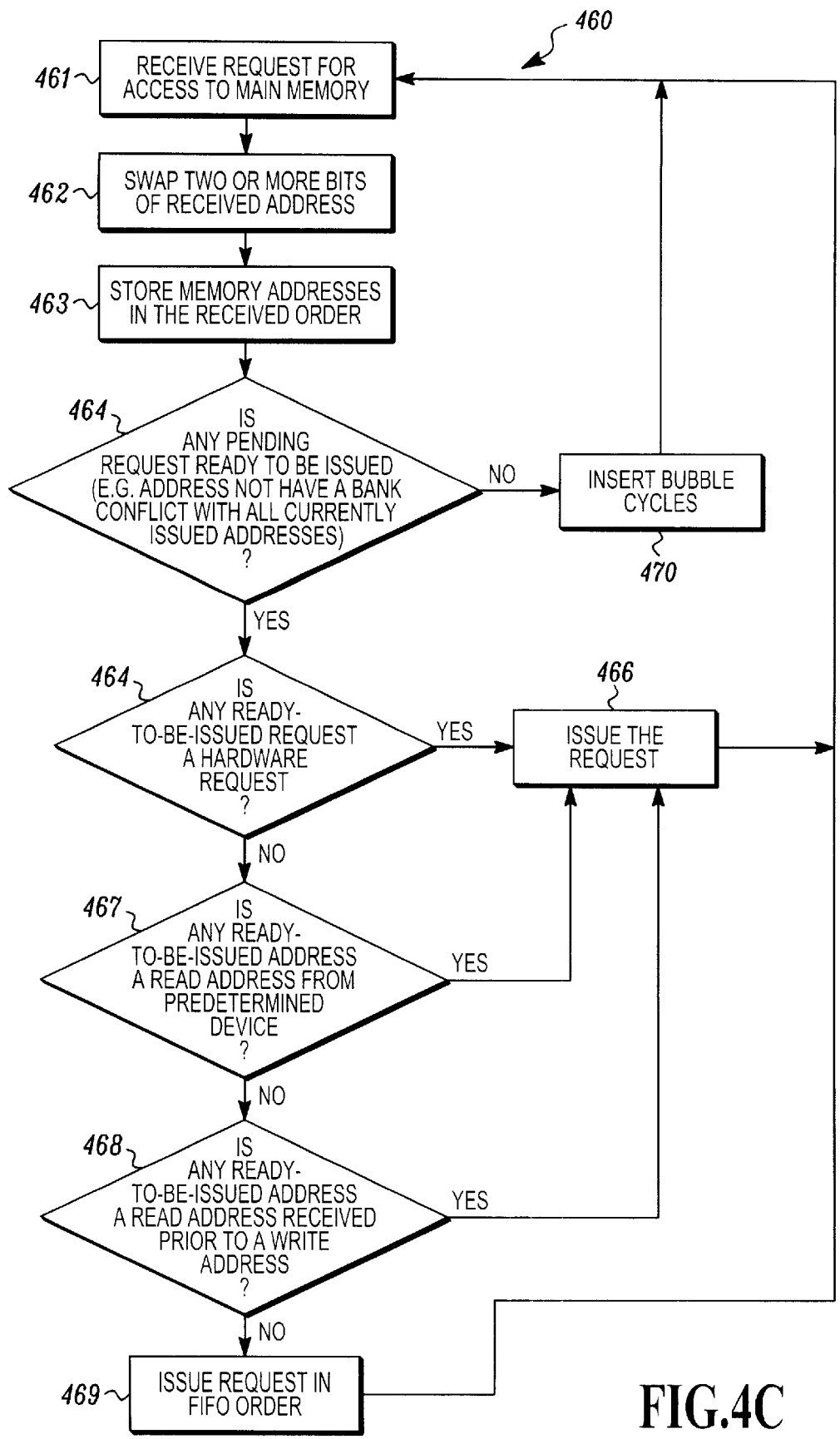
FIG. 4C illustrates, in a high level flow chart, operations performed by the memory scheduler illustrated in FIGS. 4A and 4B.

In another embodiment, a scheduler 400 (FIGS. 4A and 4B) is similar or identical to scheduler 200 described above except for the differences discussed below. Many of the reference numerals in FIGS. 4A and 4B are obtained by adding 200 to corresponding reference numerals of similar or identical components in FIG. 2A. As illustrated in FIGS. 4A and 4B, memory request store 410 is coupled either through a memory address mapper 480 or directly to a memory gateway 470. The primary difference in the embodiments illustrated in FIGS. 4A and 4B is that after receipt of memory addresses (e.g. in act 461 in FIG. 4C), memory scheduler 400 swaps two or more bits of the addresses (e.g. in act 462) by use of mapper 480 either (a) prior to storage (e.g. in act 463) of the addresses in store 410 (see FIG. 4A) or (b) subsequent to the storage (see FIG. 4B). Note that in this embodiment the addresses are stored in store 410 in the order received (i.e. in FIFO order) in a single queue, although in other embodiments, the addresses may be stored in multiple queues (e.g. one queue for each of the various types of requests), and may be stored sorted in a priority order instead of the receipt order. Scheduler 400 uses mapper 480 to perform a one-to-one mapping of each address, using a predetermined method (as described below), to interleave adjacent addresses into non-adjacent banks in main memory 403.

Another illustrative difference between the two embodiments is that in FIG. 4B instead of a write pointer (e.g. see storage element 416J in FIG. 4A), the location of storage unit 411J is relative to the remaining units 411A–411N (as determined by, for example, a queue number) is used to address the related storage elements in write store 442 and read store 452 (e.g. the queue number J is used to compute the address of storage element 442 by adding J.1 to a base address that may be the address of a first storage element 442A,) where 1 is the number of storage locations in each of storage elements 442A–442N. Numerous such modifications and adaptations of the embodiments and implementations described herein would be apparent to the skilled artisan in view of the disclosure.

In one implementation, mapper 480 operates on a 28 bit address, wherein bits 27:23 form the device identifier, bits 22:19 form the bank address, bits 18:10 form the row address, and bits 9:5 form the column address. Mapper 480 first swaps the bank address bits with the column address bits to obtain an intermediate address that interleaves cache lines, and thereafter swaps two bits in the bank address bits of the intermediate address, specifically bits at positions 5 and 8 to obtain the mapped address. Such interleaving of cache lines maps logical address to adjacent cache lines into physically non-adjacent banks in the main memory 203. So, a burst of accesses to a block of linearly accessed addresses are converted by mapper 480 to non-conflicting requests that can be issued sequentially without wasting memory bandwidth (by insertion of bubble cycles).

In one example, an address signal carries 32 bits of a logical address that identifies a one-byte storage location in main memory 203 (FIG. 2A). The logical address of 32 bits can be mapped to a 30-bit physical address (e.g. by mapper 480), that includes a 5-bit device identifier, a 3 to 6 bit bank address, a 9 to 12 bit row address, and a 5 to 7 bit column address. In this embodiment, each column in memory 203 holds 4 bytes per row and each address generates data in 16 byte chunks. One or more bits of the column address and corresponding number of bank address bits can be swapped to perform cache line interleaving.

Mapper 480 uses the mapped address in the normal manner, e.g. issues the mapped address to main memory 403, or stores the mapped address in memory request store 410 for later issuance to main memory 403. Note that mapper 480 is not used in some embodiments, e.g. in the embodiment illustrated in FIG. 2A. Specifically, mapper 480 is implemented by interleaving of bits 5 and 8 results in the following order for a sequential access of all 16 banks: 0, 8, 2, 10, 4, 12, 6, 14, 1, 9, 3, 11, 5, 13, 7, and 15.

In addition to mapper 480, scheduler 400 includes an inconsistency detector 490 that disables out of order processing of requests from store 410 when an incoming read request accesses the same memory location as a previously-received write request, e.g. by storing an active signal in a wait storage element 417J in a storage unit 411J that holds signals for the corresponding read request. Therefore, inconsistency detector 490 keeps the read request from accessing data that is yet to be invalidated by the previously-received write request. Inconsistency detector 490 includes a read interlock logic 491, and a number of address comparators 492A–492Z (although only two comparators are illustrated, in this embodiment there are N comparators, wherein N is the number of storage units 411A–411N).

Logic 491 checks a read request received at scheduler input port 401 and stored in storage unit 411J against every one of the pending write requests in memory request store 410, and if there is a match, stores a wait signal in storage element 417J. Selector 420 does not consider for issuance to memory 403 a read request in storage unit 41J while the signal in element 417J indicates a wait state. In one specific embodiment, logic 491 merely stores an active signal (e.g. a high signal) in element 417J, whereas in another embodiment, logic 491 stores in element 417J the value of the pointer that identifies a matching write request. As soon as the pending write request is completed, logic 491 stores an inactive signal in element 417J thereby to permit consideration by selector 420.

In addition to the above-described wait storage element 417J, each storage unit 411J includes additional storage elements, such as an identifier storage element 418J that identifies the device that originated the request held in storage unit 411J, a size storage element 419J that indicates whether an entire cache line or only a portion thereof is to be accessed, a write pointer storage element 416J that identifies a specific write buffer 442J that contains the data to be written to main memory 403. In one implementation, store 410 does not include the write pointer storage element, and instead includes N write buffers 442A–442N, equal in number to the number of storage units 411A–411N, thereby allowing the same pointer to be used to identify a memory address (in storage element 413J) and the associated data (in storage element 442J) to be written to a location at the memory address.

Scheduler 400 also includes write store 442 and read store 452 that are implemented e.g. by SRAMs. Note that in this embodiment, read store 452 includes an identifier storage element 453J that is associated with each read buffer 453J, and that identifies the device that generated the request for data held in the corresponding read buffer 452J. Note also that in this embodiment read store 452 and write store 442 are both coupled directly to memory interface unit 404, without any intervening device. In contrast to read store 452 and write store 442, request store 410 is coupled by the respective multiplexer 430 to main memory 403.

In the embodiment illustrated in FIG. 4A, memory request selector 420 includes a bank conflict detector 422 of the type described herein that checks (e.g. in operation 464 in FIG. 4C), if any pending request is ready to be issued (e.g. identifies an address that does not have a bank conflict with all the currently issued addresses). If not, scheduler 400 inserts bubble cycles (e.g. in act 470 in FIG. 4C).

Note that in this embodiment, bank conflict detector 422 is not directly connected to receive the signal at output port 432 of multiplexer 430, and instead is coupled thereto via one or more request holding registers 404R (e.g. 4 registers for concurrent issue of four requests) that are included in memory interface unit 404, and that are coupled to port 432.

In this embodiment, selector 420 includes one or more hardware signal requestors, such as a refresh requestor 429B and a current control requestor 429A, and an arbiter 425 that selects one of requestors 429A, 429B or a storage unit 411J for issuing a request to main memory 403. If a signal from one of storage units 411A–411N is to be passed, arbiter 425 passes a signal received from optimizer 427 that selects a storage unit 411J (e.g., as discussed below). Refresh requestor 429B passes to a control output bus 420C of scheduler 420 a hardware request signal for refreshing DRAMs in main memory 403. Current control requestor 429C if included passes to control output bus 420C another hardware-generated control signal to cause a RAC (described above) or a Direct RDRAM (that conforms to the specification available from RAMBUS, Inc.) to calibrate the current used in communication with main memory 403.

Optimizer 427 implements one or more schemes, such as the read bypass of writes scheme (as illustrated by operation 468 in FIG. 4C), for selecting a pending memory request for issue from one of storage units 411A–411N. In another scheme (also called "control-request" scheme), memory request selector 420 selects, for issue to main memory 403, a control request prior to selection of a read request or a write request even if the control request was most recently received, thereby to prioritize the control request ahead of the read and write requests. Specifically, in an operation 465, optimizer 427 checks if any ready-to-be-issued request (i.e. a request cleared for bank conflicts) is a hardware request. If so, optimizer 427 issues the request (e.g. in act 464).

In yet another scheme (also called "display-controller" scheme), scheduler 400 uses the above-described identifier storage element 418J to prioritize read requests from a predetermined device, such as display controller. Specifically, in an operation 467, optimizer 427 checks if any ready-to-be-issued request (i.e. a request cleared for bank conflicts) is from a predetermined device. If so, optimizer 427 issues the request (e.g. in act 464). The display-controller scheme ensures that a display controller is not stalled by earlier issued read requests (e.g. from the CPU).

In one embodiment, optimizer 427 selects the scheme to be used to identify a to-be-issued request in response to signals in a corresponding number of storage elements (also called "priority-scheme storage elements") 428A–428V included in memory request selector 420. In one example, memory request selector 420 includes a first priority-scheme storage element 428A for the bank optimization scheme, a second priority-scheme storage element 428R for the read-bypass scheme, and a third priority-scheme storage element 428V for the display-controller scheme.

When active signals are stored in any of the priority-scheme storage elements 428A–428V, optimizer 427 selects each corresponding scheme in the just-described order (e.g. if the signals are active in each of the first and third priority-scheme storage elements 428A and 428V, optimizer 427 first selects the bank optimization scheme, and if no request is available on use of the bank optimization scheme, then optimizer 427 uses the display-controller scheme. When none of the priority-scheme storage elements 428A–428V has an active signal, optimizer 427 resorts to first-in-first-out processing of the requests (by inserting bubble cycles as necessary). Optimizer 427's prioritization of requests based on one or more schemes as described herein allows "more important" requests to be issued prior to issuance of "less important" requests, and use of priority scheme storage elements 428A–428V allows the importance to be changed dynamically, depending on the situation.

In the embodiment illustrated in FIG. 4A, optimizer 425 waits for a ready signal from memory interface unit 404. indicating that the RAC is ready to take another request. Optimizer 425 provides a grant signal to one of requesters 429A and 429B and optimizer 427 at the last possible moment, thereby giving optimizer 425 the most options (among requesters 429A, 429B, and optimizer 427) to choose from.

In this embodiment, memory gateway 470 receives memory requests on a system bus 471 from one or more devices that are coupled to bus 471, such as CPU 493 and display controller 494. Bus 471 may be implemented as a global bus (abbreviated as "G-bus") that is a pipelined split-transaction bus. In one implementation, bus 471 can transfer up to 32 bytes of data per processor cycle for a peak bandwidth of 10 gigabytes per second at a processor frequency of 250 megahertz. Note that bus 471 can be any other type of system bus in other embodiments, such as a PCI bus.

Figure 5A:
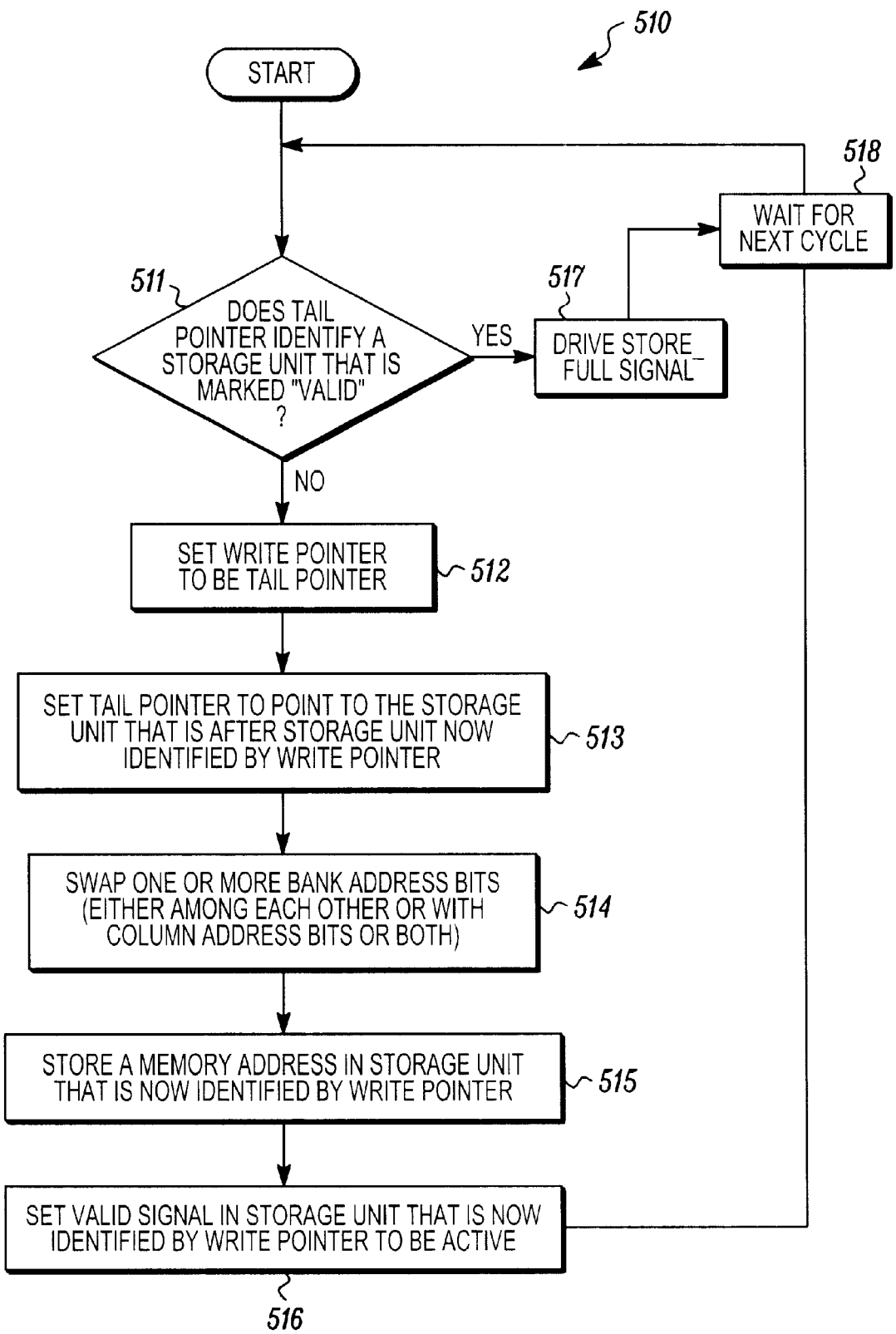
FIGS. 5A, 5B and 5C illustrate, in low level flow charts, acts performed by the memory gateway of the optimizer, and the arbiter of FIGS. 4A and 4B.

Memory gateway 470 supplies all memory requests received from bus 471 to scheduler 400 for storage in store 410, unless store 410 is full in which case the originator of the memory request is asked to retry the request at a later time. Specifically, memory gateway 470 stores signals in storage units 411A–411N of store 410 in a FIFO manner. In this particular implementation, memory gateway 470 performs a method 510 (FIG. 5A). In act 511, memory gateway 470 checks if a tail pointer (held in storage element 406 illustrated in FIG. 4A) identifies a storage unit (e.g. unit 411C) that has an active signal in valid storage element 414C. If so, memory gateway 470 goes to act 517 (FIG. 5A) and drives a signal (hereinafter "store fill" signal) active on a system bus 471 thereby to stall further memory requests from various devices that may be attached to bus 471, such as CPU 493 and display controller 494 (FIG. 4A).

Next, memory gateway 470 waits for the next memory cycle (in act 518 shown in FIG. 5A) and thereafter returns to act 511 (described above). In act 511, if the result was not true, memory gateway 470 goes to act 512 and sets a local variable called "write pointer" (e.g. held in storage element 472) to be tail pointer (e.g. copies the signal from storage element 406 to storage element 472). Thereafter, in act 513, memory gateway 470 sets tail pointer (held in storage element 406) to point to the storage unit (e.g. unit 411C) that is after the storage unit (e.g. unit 411B) now identified by the write pointer. Therefore, in act 514, memory gateway 470 swaps one or more of the bank address bits (either among each other or with column address bits or both, as described herein). Next, memory gateway 470 stores (in act 515) a memory address received from bus 471 in storage unit (e.g. unit 411B) that is now identified by the write pointer. Thereafter, memory gateway 470 stores (in act 516) an active signal in the valid storage element (e.g. element 414B), and returns to act 518 (described above).

In the just-described embodiment, a head pointer is not required to read information from, or to write information into memory store 410, because the queue in store 410 is full when the tail pointer 406 indicates a storage unit 411J that has an active signal in valid storage element 414J. Checking the signal invalid storage element 414J eliminates the need for a head pointer. In the implementation illustrated in FIG. 4A, head pointer 405 is initialized by selector 420, and is merely used to indicate the boundary of the queue (and not for filling the queue—instead, tail pointer 406 is used).

One example of a specific implementation of memory gateway 470 is illustrated in FIG. 4A. Memory gateway 470 operates at a speed (e.g. 250 MHz) that is closer to the speed of CPU 491 than to the speed of memory 203. In this implementation, scheduler 400 and memory interface unit 404 operate closer to the speed of memory 403 (e.g. at 100 MHz). Logic 460 transfers control signals between the two speed domains to ensure data consistency.

Memory request selector 420 includes a configuration circuit 428 having registers 428C that are used to hold configuration information for the operating mode of memory request selector 420. For example, values of a refresh period, timing for issuing command packets, and flags for enabling or disabling bank optimization, read by pass of writes, and bank interweaving may be stored in one or more of resistors 428C.

Main memory scheduler 400 is also coupled to a synchronization and control logic 460 provides synchronized signals to allow scheduler 400 to operate independent of the clock ratio between scheduler 400 and other devised in the rest of the system, e.g. CPU 491. In one implementation, each of memory gateway 470, address mapper 480 and memory request store 410 perform process 510 (FIG. 5A). Specifically, in act 511, gateway 470 checks if head pointer 405 (FIG. 4A) identifies a storage unit 411J that is located after another storage unit 411J−1 that is currently identified by tail pointer 406. If so, memory gateway 470 drives (as illustrated by act 517) a signal store_full active on bus 471, and thereafter waits (as illustrated by act 518) for the next cycle. Thereafter, gateway 470 returns to act 511 (described above).

If the decision in act 511 is that the storage unit identified by head pointer 405 is not located immediately after the storage unit identified by tail pointer 406, gateway 470 goes to act 512 and sets a write pointer 407 (FIG. 4A) to be same as tail pointer 406. Next, in act 513, gateway 470 sets tail pointer 406 to point to the storage unit 411J that is located immediately after storage unit 411J−1 now identified by write pointer 407.

Next, in act 514, memory address mapper 480 swaps one or more of the address bits as described above in reference to FIG. 4A. Thereafter, in act 515, memory request store 410 stores the memory address provided by mapper 480 in storage unit 411J−1 that is now identified by write pointer 407. Next, in act 516, store 410 sets a signal active in the valid storage element 414J−1 in storage unit 411J−1 that is now identified by write pointer 407. Thereafter, gateway 470 returns to act 518 and waits for the next cycle, and then goes to act 507 described above.

Figure 5B:
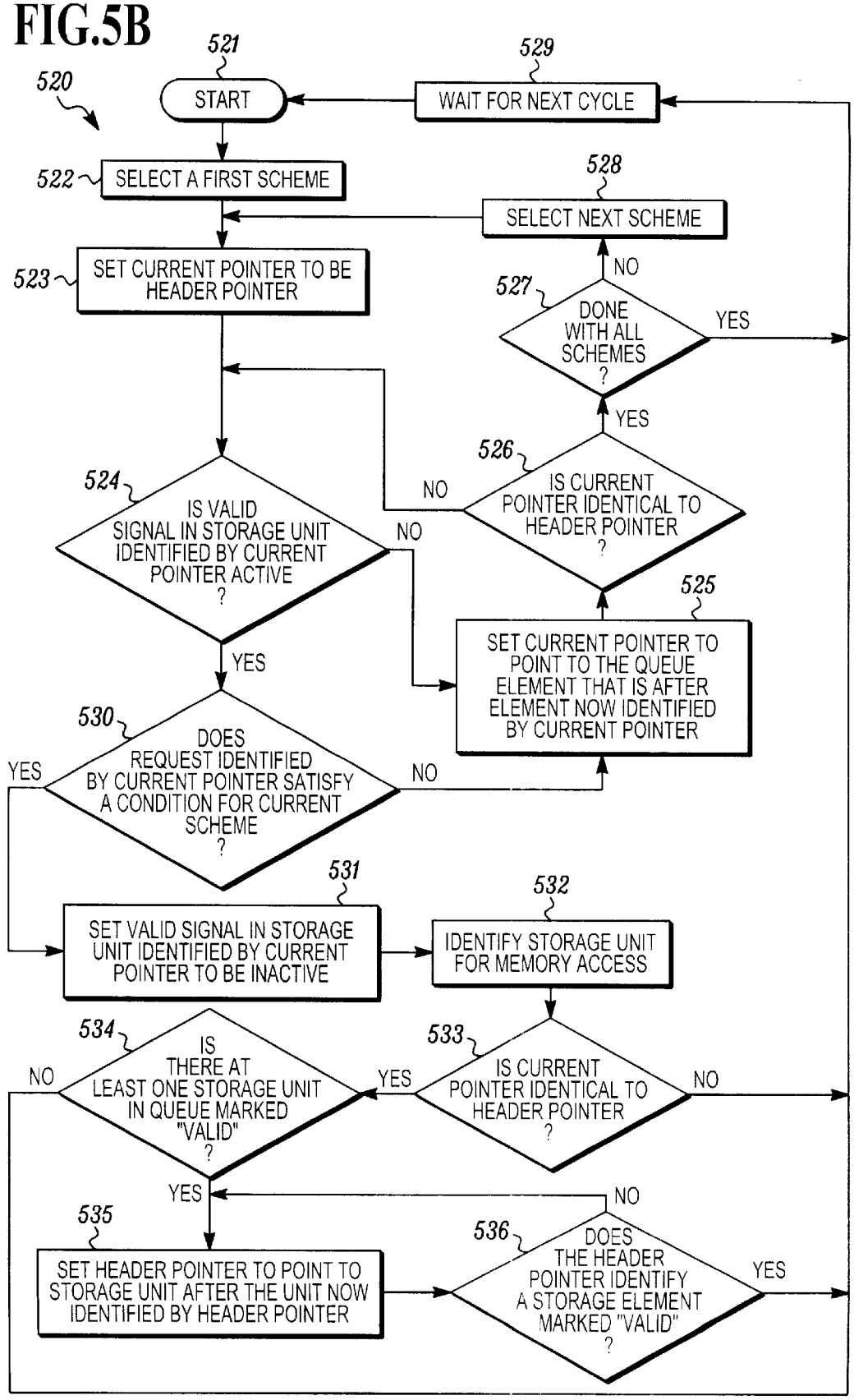

Moreover, in one embodiment, optimizer 427 (FIG. 4A) performs process 520 (FIG. 5B) to identify a request that satisfies a scheme, such as the read bypass of write scheme and the display controller scheme (described above). Specifically, optimizer 427 selects one of the various priority schemes identified by storage elements 428A–428V, and thereafter goes to act 523. In act 523, sets current pointer 408 to be head pointer 405. Next, in act 524, optimizer 427 checks if the signal in valid storage element 414J in storage unit 411J identified by current pointer 408 is an active signal. If the signal is not active, optimizer 427 goes to act 525 and sets current pointer 408 to point to storage unit 411J+1 that is located after storage unit 411J now identified by current pointer 408.

Next, in act 526, optimizer 427 checks if current pointer 408 is identical to head pointer 405. If the decision in act 526 is that the two pointers are not identical, optimizer 427 returns to act 524 (described above). When all storage units 411A–411N have been processed in the just-described manner, current pointer 408 becomes identical to head pointer 405, and the decision in act 526 leads to performance of act 527. In act 527, optimizer 427 checks if all schemes identified by storage elements 428A–428V have been selected and processed. If the decision is no, optimizer 427 goes to act 528 and selects another scheme identified by storage elements 428A–428V, and thereafter returns to act 523 (described above). If the decision in act 527 is that all schemes are been processed, optimizer 427 goes to act 529 and waits for the next cycle, and thereafter returns to act 522 (described above).

In act 524, if the signal in valid storage element 414J is active, optimizer 427 goes to act 530, and checks if the request identified by current pointer 408 satisfies a condition for the scheme is currently selected. If the decision in 530 is no, optimizer 427 returns to act 525 (described above). If the decision in act 530 is yes, optimizer 427 goes to act 531 and sets the signal in valid storage element 414A to be active, and thereafter goes to act 532. In act 532, optimizer 427 identifies to arbiter 425 (FIG. 4A) storage unit 411J as being ready for issuance to memory 403 in accordance with the currently selected scheme.

Next, in act 533, optimizer 427 checks if the current pointer 408 is identical to head pointer 405. If the decision is no, optimizer 427 returns to act 529 (described above). If the decision in act 533 is yes, optimizer 427 goes to act 534 and checks if there is at least one storage unit 411J in store 410 that has an active signal in the valid storage element 414J. If the decision in act 534 is no, optimizer 427 returns to act 529 (described above). In act 534, if the decision is yes, optimizer 427 goes to act 535 and sets head pointer 405 to point to the storage unit 411J+1 that is located after storage unit 411J currently identified by head pointer 405. Thereafter, in act 536, optimizer 427 checks if the valid storage element 414J+1 in storage unit 411J+1 has an active signal. If the decision is no in act 536, optimizer 427 returns to act 535. If the decision in act 536 is yes, optimizer 427 returns to act 529 (described above).

Figure 5C:
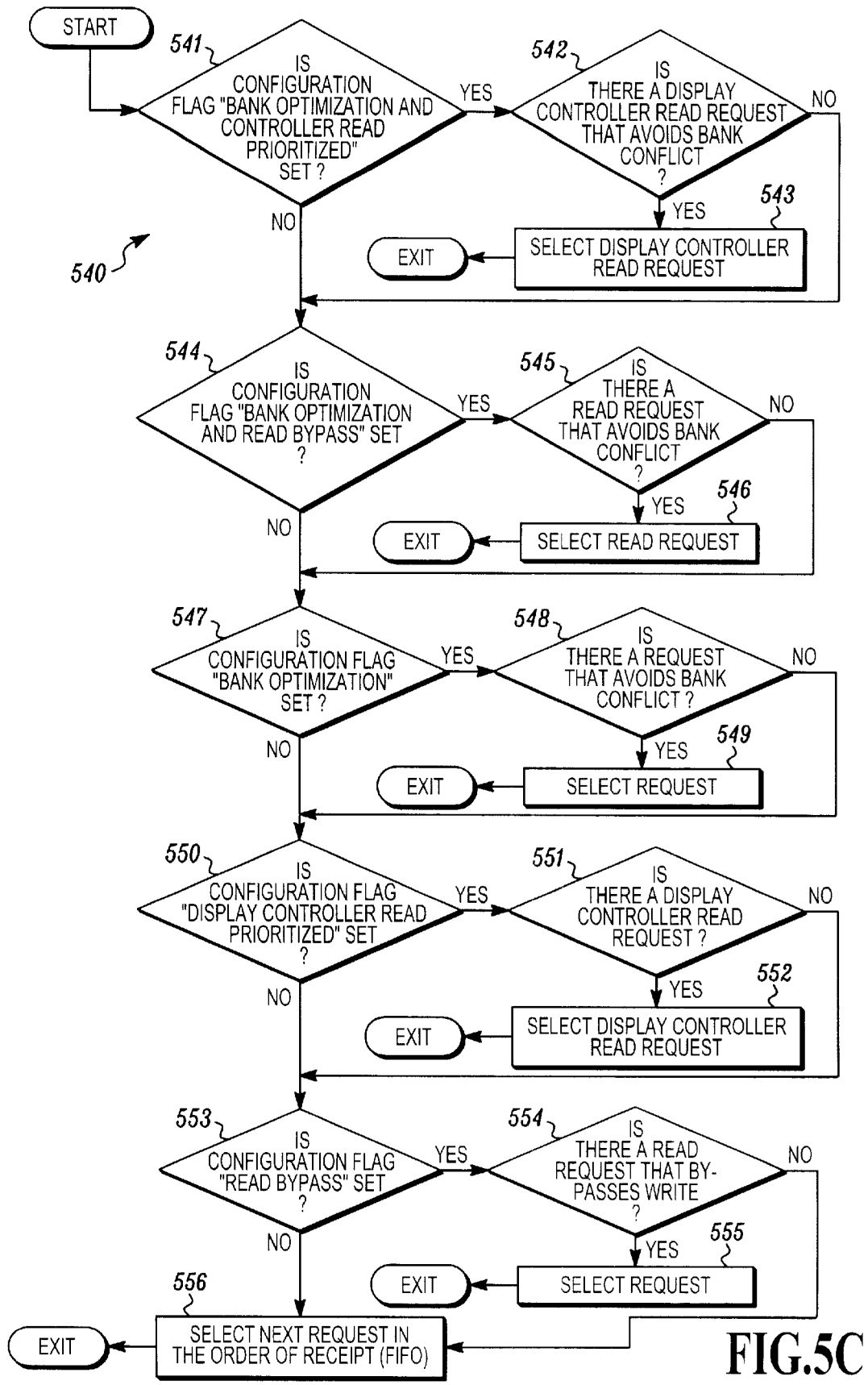

Furthermore in one embodiment, optimizer 427 (FIG. 4A) performs a process 540 (FIG. 5C) to select a request to be issued to memory 403. Specifically, in act 541, optimizer 427 checks if a flag in configuration registers 428C for the scheme bank optimization and another flag in registers 428C for the display controller scheme are set, and if so goes to act 542. In act 542, optimizer 427 checks if a request in store 410 satisfies the display controller's scheme, and also avoids bank conflict (as indicated by bank conflict detector 422). If so, optimizer 427 goes to act 543 and selects the display controller read request for issuance to memory 403 (e.g. by specifying the queue number at port 421.

If the decision in act 542 is no, optimizer 427 goes to act 544 and checks if a flag in configuration registers 428C for the bank optimizer scheme and another flag in registers 428C for the read bypass scheme are set. If so, optimizer 427 goes to act 545 and checks if a request satisfies the read bypass of write scheme, and also avoids bank conflict. If so, optimizer 427 selects that request in 546. If the decision in act 545 is no, optimizer 427 goes to act 547 and checks if the flag in registers 428C for the bank optimization scheme is set. If so, optimizer 427 goes to act 548 and checks if a request in store 410 avoids bank conflict, and if so selects that request in act 549. Otherwise, optimizer 427 goes to act 550 and checks if a flag in register 428C for the display controller scheme is set. If so, optimizer 427 goes to act 551 and checks if a request in store 401 is from a display controller, and if so selects that request in act 552.

Note that if there is a bank conflict with such a display controller request, the bank conflict causes insertion of bubble cycles by optimizer 427. If the decision in act 551 is no, optimizer 427 goes to act 553 and checks if a flag in configuration registers 428C for the read bypass scheme is set. If so, optimizer 427 goes to act 554 and checks if a request in memory store 410 satisfies the read bypass scheme, and if so elects that request in act 555. Otherwise, optimizer 427 goes to act 556 and selects a request from store 410 in the order of receipt, i.e. first-in-first-out (FIFO) processing.

Depending on the implementation, FIFO processing can be performed in other situations as well, e.g. when there are two requests in store 410 that access the same location, with a write request being earlier than a read request. In another example, FIFO processing is performed when the pending requests are related to accessing one or more registers 428 in memory request selector 420, e.g. to set or clear one or more of flags in configuration registers 428C. In another example, FIFO processing is performed if the number of write requests in store 410 that are currently pending is greater than a predetermined number, e.g. greater than 5.

In yet another example, FIFO processing is performed when a write request in store 410 has been kept pending for a predetermined time period, e.g. due to the processing of read requests in conformance with the read bypass of writes scheme. In the just-described examples related to write requests, FIFO processing frees up the storage units that are marked as invalid (i.e. valid storage element 414J has an inactive signal), and that were previously used to hold read requests that have been processed in accordance with the read bypass of write scheme, and which storage units are located between other storage units that hold pending write requests (e.g. storage elements 414A and 414N have active signals, and have valid values in write pointer storage elements 416A and 416N). Such freed storage units can be used for holding additional requests provided by memory gateway 470.

Numerous modifications and adaptations of the above-described embodiments will be apparent to a person of skill in the art of designing memory controllers in view of the enclosed disclosure. For example, instead of having read and write requests in a single memory request store 210 (FIG. 2A), another embodiment has two separate request stores—a write request store, a read request store—with processing of requests from the read store being stalled when an incoming read request requires a wait flag to be set due to a previously-received write request to the same memory address.

As another example, instead of having multiple categories that can be dynamically enabled or disabled, another embodiment has a memory request selector 220 that is hardwired to use a single category, e.g. to select the oldest request that does not cause a bank conflict with a request currently issued to main memory 203. As yet another example, instead of having a predetermined order in the use of require selection schemes (i.e. first scheme to fourth scheme), the order of use can be stored in a storage element that is used by optimizer 427 to pick the scheme to be processed first. As still another example, read-write requestor 429A does not contain bank conflict detector 422 (FIG. 4A) and instead simply passes all requests (without checking for bank conflicts) to optimizer 427. Various such modifications and adaptations are encompassed by the attached claims.

What is claimed is:

1. A main memory scheduler having a scheduler output port, the scheduler output port being couplable to a main memory, the main memory scheduler comprising:

a memory request store including a plurality of storage units, each storage unit including a memory address storage element for holding an address to be issued to main memory, each storage unit having a storage output bus;

a multiplexer including selection line, a multiplexer output port coupled to the scheduler output port, the multiplexer including of plurality of multiplexer input ports, each multiplexer input port being coupled to the storage output bus of one of the storage units;

a memory request selector including a selector output terminal coupled to the multiplexer selection line, the memory request selector further including a plurality of selector input ports, each selector input port being coupled to the storage output bus of one of the storage units; and a bank conflict detector coupled to each of the selector input ports and to the selector output terminal, the bank conflict detector having an output bus, a first address input bus, and a second address input bus, the first address input bus being coupled to at least one of the memory address storage elements in the memory request store for carrying the to-be-issued address, the bank conflict detector including a same/adjacent bank detection unit that compares at least the to-be-issued address and a previously issued address on the second address input bus, the same/adjacent bank detection unit driving a signal on the output bus when each of the to-be-issued address and the previously issued address identify a single bank in main memory, wherein the memory scheduler restricts consecutive memory accesses from being issued to a coincident memory address in main memory.

2. The main memory scheduler of claim 1, wherein the bank conflict detector includes an adjacent bank detection unit coupled to each of the first address input bus and the second address input bus and the bank conflict output bus, the adjacent bank detection unit driving a signal active on the bank conflict output bus when the to-be-issued address and previously issued address identify adjacent banks in main memory.

3. The main memory scheduler of claim 2, wherein the bank conflict detector also includes a dependency detection unit having a first input terminal coupled to the same bank detection unit and a second input terminal coupled to the adjacent bank detection unit, the dependency detection unit having an output terminal coupled to the bank conflict output bus, the dependency detection unit further having a dependent flag input line that carries a signal indicative of the type of dependency among banks in the main memory, the dependency detection unit passing the signal at the first input terminal to the output terminal in response to the signal on the dependent flag input line being inactive, and passing the signal at the second input terminal to the output terminal in response to the signal on the dependent flag input line being active.

4. The main memory scheduler of claim 3 wherein the bank conflict detector includes a plurality of exclusive OR gates, each exclusive OR gate being coupled to each of the first address input bus and the second address input bus, each exclusive OR gate having an output line coupled to each of the same bank detection unit and the adjacent bank detection unit.

5. The main memory scheduler of claim 3, wherein the adjacent bank detection unit includes a plurality of adjacency circuits and an OR gate coupled to each adjacency circuit unit, the OR gate having an output line coupled to the dependency detection unit, each adjacency circuit being coupled to each of said exclusive OR gates, each adjacency circuit having a plurality of first address input terminals coupled to the first address input bus, and a plurality of second address input terminals coupled to the second address input bus, the number of said first input terminals and said second input terminals being equal to each other and different from a corresponding number for another adjacency circuit.

6. The main memory scheduler of claim 1 for the comprising:
a memory address mapper having a plurality of input address terminals, and a plurality of output address terminals, the output address terminals being coupled to the first address input bus, the memory address mapper swapping at least two bits in the signal received at the address input terminals and providing the swapped signal to the address output terminals.

7. The main memory scheduler of claim 1 wherein:
each storage unit includes a first storage element;
an active signal in the first storage element indicates that an operation to be performed in the main memory at a location indicated by an address signal held in the memory address storage element of the storage unit, and an inactive signal in the first storage element indicates that no operation is to be performed at the location; and
the memory request selector stores the inactive signal in the first storage element on performance of the operation.

8. The main memory scheduler of claim 7 wherein:
each storage unit further includes a type storage element, a first value of a type signal held in the type storage element indicating a read request and a second value of the type signal indicating a write request; and
the memory request selector drives on the selector output port a first signal indicative of the read request prior to driving a second signal for the write request even if the read request was received by the memory request store after receipt of the write request, unless the read request and the write request indicate operations at a common location in main memory.

9. The main memory scheduler of claim 8 wherein:
each storage unit further includes a wait storage element, an active signal held in the wait storage element indicating a read request to be performed after a write request at a common location in main memory; and
the memory request selector drives on the selector output port the second signal prior to driving the first signal when the signal is active in the wait storage element of any storage unit.

10. The main memory scheduler of claim 8 wherein:
the memory request selector includes a plurality of memory category storage elements; and
the memory request selector drives the first signal prior to driving the second signal only in response to an active signal in a first memory category storage element.

11. The main memory scheduler of claim 10 wherein:
the memory request selector drives on the selector output port a third signal indicative of a control request prior to driving either the first signal or the second signal in response to receipt of the control request.

12. The main memory scheduler of claim 8 wherein:
each storage unit further includes an identifier storage element, an identifier signal held in the identifier storage element indicating the identity of a device that originates the memory address signal held in the storage unit; and
the memory request selector drives on the selector output port a third signal indicative of a second read request prior to driving the first signal or the second signal when the second read request originates from a display controller as determined from the identifier signal in the storage unit that holds the second read request.

13. The main memory scheduler of claim 8 wherein:
the memory request selector drives on the selector output port a third signal prior to driving the second signal when the third signal indicates an intermediate write request that is received prior to the write request indicated by the second signal.

* * * * *